(12) United States Patent
Kirk et al.

(10) Patent No.: US 12,721,253 B2
(45) Date of Patent: Sep. 1, 2026

(54) METHODS AND APPARATUS TO DETERMINE SOFT BOUNDARIES THROUGH VARIABLE CONFIDENCE INTERVALS

(71) Applicant: Deere & Company, Moline, IL (US)

(72) Inventors: Ryan Kirk, Urbandale, IA (US); Mo Fotouhi, Madison, WI (US); Jared Grove, Saint Charles, IA (US); Matthew Burke, Denver, CO (US); Benjamin Edward Bitzko, Johnston, IA (US)

(73) Assignee: Deere & Company, Moline, IL (US)

( * ) Notice: Subject to any disclaimer, the term of this patent is extended or adjusted under 35 U.S.C. 154(b) by 133 days.

(21) Appl. No.: 18/765,028

(22) Filed: Jul. 5, 2024

(65) Prior Publication Data

US 2025/0130582 A1 Apr. 24, 2025

Related U.S. Application Data

(60) Provisional application No. 63/591,833, filed on Oct. 20, 2023.

(51) Int. Cl.
*A01B 79/00* (2006.01)
*G05D 1/648* (2024.01)
(Continued)

(52) U.S. Cl.
CPC ......... *A01B 79/005* (2013.01); *G05D 1/6484* (2024.01); *G05D 2105/15* (2024.01); *G05D 2107/21* (2024.01)

(58) Field of Classification Search
CPC .. G05D 1/617; G05D 1/6482; G05D 2105/15; G05D 2107/21; G05D 1/2297;
(Continued)

(56) References Cited

U.S. PATENT DOCUMENTS 5,793,371 A 8/1998 Deering
6,771,829 B1 8/2004 Topiwala et al.
(Continued)

FOREIGN PATENT DOCUMENTS

EP 2815382 B1 * 1/2022 ............. G06T 7/149
WO WO-2019030094 A1 * 2/2019 ........... G01S 15/931

OTHER PUBLICATIONS

EP-2815382-B1 translation (Year: 2022).*
(Continued)

*Primary Examiner* — Frederick M Brushaber
(74) *Attorney, Agent, or Firm* — Hanley, Flight & Zimmerman, LLC

(57) ABSTRACT

Systems, apparatus, articles of manufacture, and methods are disclosed to determine a boundary for vehicle operation in queried plot of land. An example apparatus includes circuitry to instantiate machine-readable instructions to: generate a first boundary based on a query for a boundary of a plot of land; compute a first probabilistic boundary for the first boundary based on an error of generation of the first boundary; compute a second probabilistic boundary for a second boundary based on an error of generation of the second boundary; and combine the first probabilistic boundary and a second probabilistic boundary to generate a soft boundary, the combination based on a first confidence score and a second confidence score.

20 Claims, 16 Drawing Sheets

(51) Int. Cl.
*G05D 105/15* (2024.01)
*G05D 107/20* (2024.01)

(58) Field of Classification Search
CPC . G05D 1/6484; G05D 2109/10; A01B 79/005
See application file for complete search history.

(56) References Cited

U.S. PATENT DOCUMENTS

| | | | | |
|---|---|---|---|---|
| 7,110,881 | B2 | 9/2006 | Gray et al. | |
| 7,664,715 | B2 | 2/2010 | Vatchkov et al. | |
| 7,696,906 | B2 | 4/2010 | Dey | |
| 8,204,654 | B2 | 6/2012 | Sachs et al. | |
| 8,750,567 | B2 * | 6/2014 | Zhang | G06T 7/181 348/148 |
| 9,066,465 | B2 | 6/2015 | Hendrickson et al. | |
| 9,384,204 | B2 | 7/2016 | Gupta | |
| 9,786,176 | B2 | 10/2017 | Northrup et al. | |
| 10,147,185 | B2 * | 12/2018 | Riklin Raviv | G16H 50/50 |
| 10,497,084 | B2 | 12/2019 | Appu et al. | |
| 10,498,355 | B2 | 12/2019 | Hong et al. | |
| 10,546,245 | B2 | 1/2020 | Virkar et al. | |
| 10,605,610 | B2 | 3/2020 | Cummings | |
| 10,889,958 | B2 | 1/2021 | Oblak et al. | |
| 10,912,251 | B2 | 2/2021 | Pickett et al. | |
| 10,937,214 | B2 * | 3/2021 | Nerurkar | G06F 16/29 |
| 11,003,188 | B2 * | 5/2021 | Scott | G05D 1/0274 |
| 11,157,737 | B2 * | 10/2021 | Zhao | G06T 7/11 |
| 11,200,280 | B2 | 12/2021 | Rohlf et al. | |
| 11,416,478 | B2 | 8/2022 | Burns | |
| 12,100,101 | B2 * | 9/2024 | Min | G06V 20/176 |
| 2009/0037058 | A1 | 2/2009 | Senneff et al. | |
| 2009/0292426 | A1 | 11/2009 | Nelson et al. | |
| 2011/0295423 | A1 | 12/2011 | Anderson | |
| 2014/0002489 | A1 | 1/2014 | Sauder et al. | |
| 2018/0325012 | A1 | 11/2018 | Ferrari et al. | |
| 2020/0125860 | A1 * | 4/2020 | Hyun | G06T 7/11 |
| 2020/0153926 | A1 | 5/2020 | Slater | |
| 2020/0402303 | A1 | 12/2020 | Georgiou | |
| 2021/0103728 | A1 | 4/2021 | Young | |
| 2021/0256571 | A1 | 8/2021 | Hawkins et al. | |
| 2022/0067027 | A1 | 3/2022 | Lee et al. | |
| 2022/0094767 | A1 | 3/2022 | Lehmann et al. | |
| 2022/0132722 | A1 | 5/2022 | Bomleny et al. | |
| 2022/0132723 | A1 | 5/2022 | Anderson | |
| 2022/0292729 | A1 | 9/2022 | Mullen et al. | |
| 2022/0301177 | A1 * | 9/2022 | Amer | G06T 7/0012 |
| 2023/0062313 | A1 * | 3/2023 | Min | G06V 20/176 |
| 2023/0066759 | A1 * | 3/2023 | Benoussaid | G06N 5/045 |
| 2023/0131349 | A1 | 4/2023 | Toyoshiba | |
| 2023/0315120 | A1 * | 10/2023 | Linkowski | G05D 1/0274 701/26 |
| 2023/0418293 | A1 | 12/2023 | Davis | |

OTHER PUBLICATIONS

Zheng et al., "Deep Level Set with Confidence Map and Boundary Loss for Medical Image Segmentation," IEEE International Conference on Multimedia and Expo (ICME), Jul. 6-10, 2020, retrieved from <doi.org/10.1109/ICME46284.2020.9102902> on Apr. 20, 2026, 6 pages.

United States Patent and Trademark Office, "Non-Final Office Action," issued in connection with U.S. Appl. No. 18/765,030, dated May 5, 2025, 12 pages.

United States Patent and Trademark Office, "Final Office Action," issued in connection with U.S. Appl. No. 18/765,030, dated Oct. 29, 2025, 15 pages.

United States Patent and Trademark Office, "Non-Final Office Action," issued in connection with U.S. Appl. No. 18/764,982, dated Dec. 29, 2025, 16 pages.

United States Patent and Trademark Office, "Advisory Action," issued in connection with U.S. Appl. No. 18/765,030, dated Jan. 15, 2026, 3 pages.

United States Patent and Trademark Office, "Non-Final Office Action," issued in connection with U.S. Appl. No. 18/765,030, dated Mar. 25, 2026, 16 pages.

* cited by examiner

METHODS AND APPARATUS TO DETERMINE SOFT BOUNDARIES THROUGH VARIABLE CONFIDENCE INTERVALS

RELATED APPLICATION

This patent claims the benefit of U.S. Provisional Patent Application No. 63/591,833, which was filed on Oct. 20, 2023. U.S. Provisional Patent Application No. 63/591,833 is hereby incorporated herein by reference in its entirety. Priority to U.S. Provisional Patent Application No. 63/591,833 is hereby claimed.

FIELD OF THE DISCLOSURE

This disclosure relates generally to boundaries for vehicle operation and, more particularly, to methods and apparatus to determine probabilistic boundaries for specific plots of land.

BACKGROUND

In recent years, vehicles have become increasingly automated. As one example, agricultural vehicles may semi-autonomously or fully-autonomously drive and perform operations on plots of land. When driving and performing operations on plots of land, agricultural vehicles may receive maps to guide their path. Agricultural vehicles perform operations using implements including planting implements, spraying implements, harvesting implements, fertilizing implements, strip/till implements, etc. The control of these implements may be determined based on the position of the agricultural vehicle on the plot of land. These autonomous agricultural vehicles include multiple sensors to help navigate without assistance, or with limited assistance, from human users.

Figure 1:
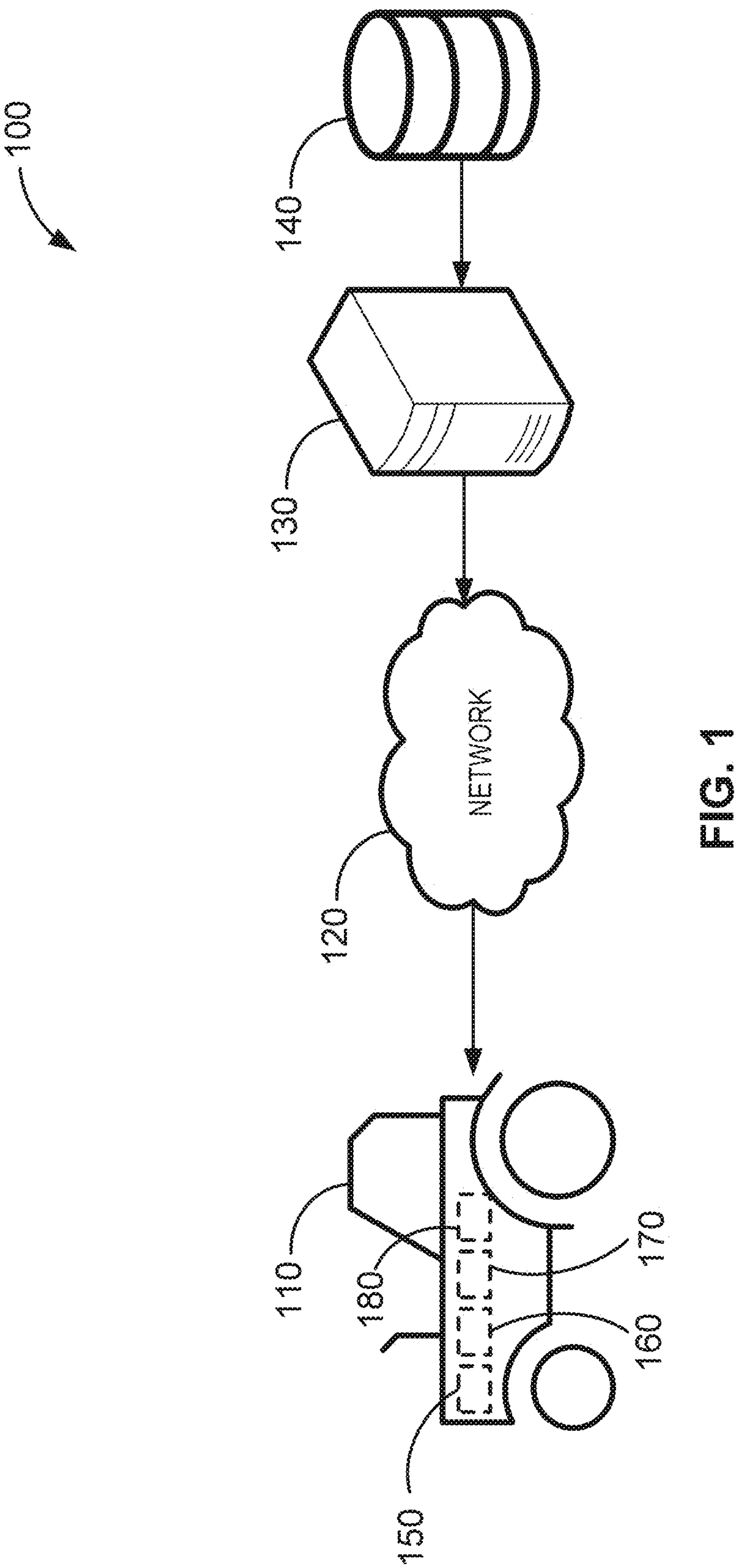
FIG. 1 is a block diagram of an example environment in which an example vehicle operates according to boundaries.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Automation of vehicles is desired. Such vehicle automation improves the accuracy of the performance of operations, reduces operator fatigue, improves efficiency, and accrues other benefits. In particular, the automation of agricultural vehicles has beneficial secondary effects such as increased efficiency of agricultural operations and/or increased precision of the placement of agricultural material.

The automation of vehicles across a plot of land having different conditions, requirements, or operations, requires boundaries that dictate the travel and operation of the vehicle throughout subzones. As discussed herein, a boundary is a border between adjacent regions of a plot of land, wherein the regions encompassed by the boundaries are subzones. One type of subzone is an exclusion zone in which the vehicle may not perform any, or may only perform a certain, agricultural operation(s). Exclusion zones may be fixed and applied to all operations. In other examples, exclusion zones may only apply to certain activities, like tillage, and allow other activities, like traversal. Some exclusion zones are temporary, such as when the field is too muddy to permit traversal and are removed when the plot of land dries.

While the generation of boundaries and subzones for machine operation is highly advantageous, current methods are burdensome as the boundaries are generated from tabular geospatial data. However, working with tabular geospatial data is challenging. First, tabular geospatial data contains numerous redundant data points that make the dataset large and difficult to manage. Second, transferring large tabular datasets is time-consuming, especially when dealing with remote teams or clients. Third, visualization of an entire tabular geospatial data set, which is necessary to help detect patterns, relationships, and trends, is very difficult. Lastly, tabular datasets are costly to store and process.

The boundaries come from a variety of sources. These boundaries can be hand-drawn (e.g., using mapping software), machine-generated, algorithmically developed (e.g., based on historical travel paths), etc. Consequently, a process to combine existing boundaries is necessary. Then, during combination, confidence in a boundary determines when a plot of land is ready for automation. Conventional boundary combination methods can combine boundaries but are unable to express a confidence in each boundary during combination.

The boundaries define subzones and exclusion zones. Conventional subzones for vehicle operation rely on a method where the vehicle is controlled to perform a certain operation while traveling between each boundary. In doing so, the presence of hazards or natural obstacles is difficult to detect and account for in an autonomous operation. Conventional subzones and boundaries of a plot of land do not account for areas where the actual boundary of the plot of land is uncertain in a region. In areas where the boundary is uncertain, the operator of the vehicle must use a judgment call of where to travel. Uncertainty of a boundary may arise from discrepancies between data from outside sources (e.g., map data, satellite data, etc.) and the actual conditions of the specific plot of land. Example conditions giving rise to regions of interest for placement of a boundary include regions of a plot of land with characteristics that will result in poor outcomes (poor soil, low moisture, etc.), natural obstacles (trees, streams, steep slopes, etc.), trial zones, and hazards (such as, spraying in residential areas, etc.).

The examples disclosed herein allow for compression of tabular geospatial data sets to analyze a plot of land and produce a set of geospatial features that correspond to the plot of land. As used herein, a plot of land refers to a portion of land about which the user wishes to obtain information, data sets, boundaries, etc. Then, this set of geospatial features is used to generate subzones or boundaries of the plot of land within which machine operations (e.g., machine travel, agricultural operations, etc.) are assigned. After assignment of machine operations, an autonomous vehicle can navigate the plot of land, within the generated boundaries, performing the assigned machine operations per each subzone.

Along with other sources of data, generated subzones or boundaries may be used to generate a soft boundary. As used herein, a soft boundary is a probabilistic boundary. The probabilistic boundary may be generated from a combination of existing boundaries from different sources with weighted confidences to return a combined boundary. As a result of the combination, each point along the combined boundary has a distribution of possible locations.

The disclosed systems and methods address issues of the conventional approaches. Particularly, the solution herein allows for the generation of soft boundaries in a plot of land.

FIG. 1 is a block diagram of an example operational environment 100. An example vehicle 110 is in communication with a network 120, which is also in communication with one or more servers 130. The server 130 utilizes one or more databases 140 to store information used to determine boundaries. In one example, the server 130 accesses information from the database 140 and determines one or more boundaries, subzones, and/or exclusion zones, which are communicated through the network to the vehicle 110.

As shown in the example of FIG. 1, the vehicle 110 includes an example position determination system 150, an example navigation system 160, an example data store 170, and an example communication system 180. The communication system 180 receives the boundary information from the server 130 via the network 120 and stores the same in the data store 170. In some examples, data collected by the position determining system 150 may be sent back to the server 130 via the network 120. The navigation system 160, which may include an automated driving functionality, controls navigation of the vehicle 110 in accordance with the information in the data store 170, including boundaries, subzones, exclusion zones, etc. Thus, the vehicle operations are controlled in accordance with the boundaries generated by the server 130.

The example vehicle 110 of FIG. 1 may be an agricultural vehicle (e.g., a tractor, a front loader, a harvester, a cultivator, a mower, or any other suitable vehicle), a construction vehicle, a forestry vehicle, or other work vehicle. In the example of FIG. 1, the vehicle 110 is represented as a tractor; however, other vehicles may additionally or alternatively be included. The vehicle 110 can move between different locations and over different terrain.

The example network 120 of FIG. 1 shuttles communication between the server 130 and the example vehicle 110. The example network 120 may be implemented by wireless communication, satellite communication, or other suitable communication modes.

The example server 130 of FIG. 1 may be instantiated, implemented, or performed as described in connection with the processor circuitry of FIGS. 11-14.

The example database 140 of FIG. 1 stores information concerning plots of land, machine operations, etc., for use by the server 130. The example database 140 may be implemented by magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

While in the example of FIG. 1, the server 130 and the database 140 are shown separate from the vehicle 110, in other examples the functionality described herein as associated with the server may be implemented within the vehicle 110. For example, the vehicle 110 may be equipped with processing power, such as a server, and data storage, such as a database, to implement the functions associated with the server 130 and the database 140 described herein.

In FIG. 1, the example position determination system 150 may be a GNSS receiver included in the vehicle 110. This example position determination system 150 may be equipped with Global Navigation Satellite System (GNSS), Global Positioning Systems (GPS), Light Detection and Ranging (LIDAR), Radio Detection and Ranging (RADAR), Sound Navigation and Ranging (SONAR), telematics sensors, etc. In some examples, the example GNSS receiver may use differential correction such as (a) precise point positioning (PPP) mode or wide area augmentation, or (b) RTK (real time kinematic) mode. The RTK system or mode requires at least one local base station that provides correction information wirelessly to the GNSS receiver with a wireless communications device that can receive correction data from the local base station in RTK. Similarly, for the GNSS receiver operating as PPP or PPP mode has a network of reference GNSS stations at known locations that provide a correction signal to the GNSS receiver on the vehicle 110 via a wireless communications device, such as satellite communications device. In some examples, this position determination system 150 may be connected to a central server (e.g., John Deere Operations Center "OpsCenter," server 130 of FIG. 1, etc.) where collected boundary data and collected subzone data are stored from past operations on that plot of land. Each time the same plot of land has equipment travel over the land or perform an operation on that land, such as tilling, planting, spraying, harvesting, or performing other work tasks, boundary data is collected to be stored in the database 140 for use in successive agricultural operations.

The navigation system 160 receives, processes, and transmits example instructions to control operation of the vehicle 110. The navigation system 160 may also receive instructions to perform various machine operations such as tilling, planting, spraying, harvesting, or other work tasks. Additionally or alternatively, the navigation system 160 may transmit information of the terrain and machine operation performed for a specific plot of land to the server 130.

The data store 170 receives, processes, and transmits example instructions from the server 130. The data store 170 may be a memory, and store instructions for later or contemporary use by the vehicle 110. The instructions contained in the data store 170 may correspond to vehicle operation instructions and/or collected data from the plot of land.

The communication system 180 receives, processes, and transmits example instructions from the server 130 to the data store 170 and the navigation system 160. The communication system 180 may communicate instructions concerning boundaries, maps, sensor data, etc. The communication system may be implemented as a wireless system, a cellular system, a satellite system, a radio system, etc.

Figure 2:
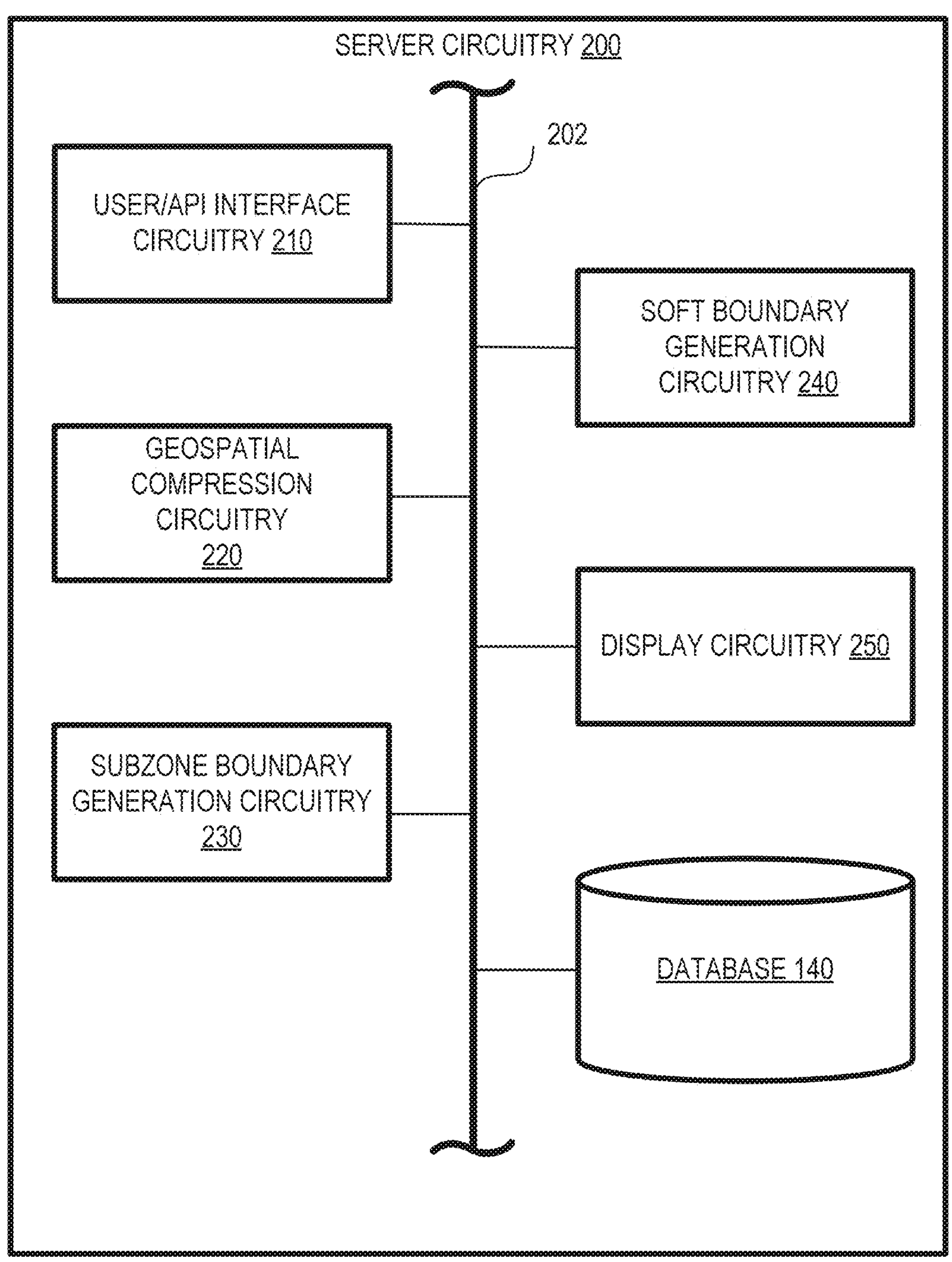
FIG. 2 is an example circuitry diagram of the example server of FIG. 1.

FIG. 2 is a block diagram representative of example server circuitry 200 to implement the server 130 of FIG. 1. The components of the example server circuitry 200 are connected by an example bus 202. The user/API interface circuitry 210 receives a user request for compressed data and/or boundaries/subzones within a plot of land. The geospatial compression circuitry 220 compresses the data for use in later implementations and may extract features for a requested plot of land. The subzone boundary generation circuitry 230 may use the compressed data, uncompressed data, or the set of geospatial features to detect differing values (e.g., subzones) within the dataset to prescribe differing machine operations based on the detected values. The soft boundary generation circuitry 240 generates soft boundaries for use in applications such as subzone detection and other boundary applications. The soft boundary generation circuitry 240 may use compressed data from the geospatial compression circuitry and/or uncompressed data from another source. Additionally or alternatively, the soft boundary generation circuitry 240 may generate soft boundaries to be used by the subzone boundary generation circuitry 230. Upon generation of a compressed data set, a set of geospatial features, a subzone, or a soft boundary, the display circuitry 250 may display the result. Lastly, the compressed data set, the set of geospatial features, the subzone, or the soft boundary may be stored in the database 140. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The example server 130 of FIG. 1 may be instantiated (e.g., creating an instance of, bring into being for any length of time, materialize, implement, etc.) by programmable circuitry such as a Central Processor Unit (CPU) executing first instructions. Additionally or alternatively, the example server 130 of FIG. 1 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

Figure 3:
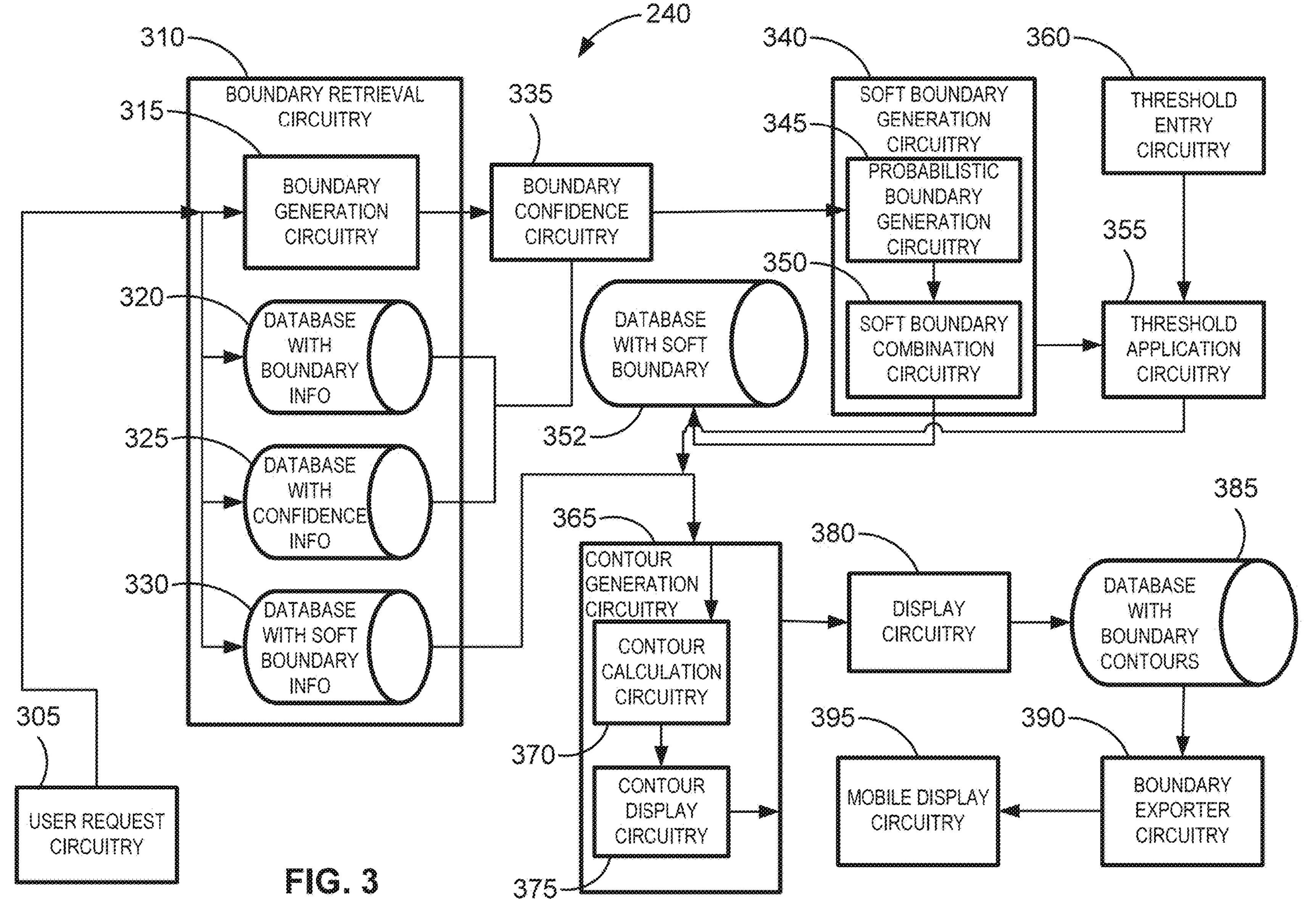
FIG. 3 is a block diagram of an example data flow structured to execute, instantiate, and/or perform the example machine-readable instructions to implement the soft boundary generation circuitry of FIG. 2.

FIG. 3 is a block diagram representative of an example implementation of the server 130 of FIG. 1 to instantiate the soft boundary generation circuitry 240 of FIG. 2. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

The circuitry diagram of the soft boundary generation circuitry 240 of FIG. 3 begins with user request circuitry 305 to receive a user request for a soft boundary. The user request may be a request for a boundary in a particular plot of land with corresponding georeferenced coordinates. As used herein, georeferenced coordinates may include a global coordinate system and/or a local coordinate system. In some examples, georeferenced coordinates may include latitude and longitude coordinates. The request may be for an area of land, a plot of land, a field, a jobsite, a specific machine operation, or set of machine operations. The user could be a human, an API, or an automatic process. The request may be instantiated by clicking a button, providing credentials to execute code, or automatically by a new set of data entered for the plot of land subject to the request. This user request may be sent to a web/mobile application interface that allows interaction with land data or machine operation data. As shown in FIG. 3, the user request circuitry 305 initiates operations within the web/mobile application (e.g., 310-395). In some examples, the user request circuitry 305 is instantiated, in part, by programmable circuitry executing user request instructions and/or configured to perform operations such as those represented by the flowchart of FIG. 8 (block 810).

In some examples, the soft boundary generation circuitry 240 includes means for receiving a user request for a soft boundary. For example, the means for receiving the user request for the soft boundary may be implemented by user request circuitry 305. In some examples, the user request circuitry 305 may be instantiated by programmable circuitry such as the example programmable circuitry 1412 of FIG. 14. For instance, the user request circuitry 305 may be instantiated by the example microprocessor 1500 of FIG. 15 executing machine executable instructions such as those implemented by at least block 810 of FIG. 8. In some examples, the user request circuitry 305 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the user request circuitry 305 may be instantiated by any other combination of hardware, software, and/or firmware. For example, the user request circuitry 305 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

After the user request circuitry 305 receives the user request, boundary retrieval circuitry 310 polls various databases to retrieve information concerning the plot of land of the user request. These databases include database with boundary information 320, database with confidence information 325, and database with soft boundary information 330. The boundary retrieval circuitry 310 checks that a soft boundary for the requested plot of land does not already exist and, if the soft boundary exists, whether the soft boundary is up to date. An update may be required for the soft boundary if there has been new data added, if various meta data (e.g., a default confidence score) have changed, or a certain time-period has passed since a previous update. If a soft boundary exists and is up to date, the boundary information is pulled from the database with soft boundary info 330 and control proceeds to contour generation circuitry 365. However, if either the soft boundary does not exist or is not up to date, the boundary retrieval circuitry 310 pulls information from the database with boundary information 320 and the database with confidence information 325. In some examples, the boundary retrieval circuitry 310 is instantiated, in part, by programmable circuitry executing boundary retrieval instructions and/or configured to perform operations such as those represented by the flowchart of FIG. 9 (blocks 910-950).

In some examples, the soft boundary generation circuitry 240 includes means for retrieving information corresponding to a plot of land of a user request. For example, the means for retrieving information corresponding to the plot of land of the user request may be implemented by boundary retrieval circuitry 310. In some examples, the boundary retrieval circuitry 310 may be instantiated by programmable circuitry such as the example programmable circuitry 1412 of FIG. 14. For instance, the boundary retrieval circuitry 310 may be instantiated by the example microprocessor 1500 of FIG. 15 executing machine executable instructions such as those implemented by at least blocks 910-950 of FIG. 9. In some examples, the boundary retrieval circuitry 310 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the boundary retrieval circuitry 310 may be instantiated by any other combination of hardware, software, and/or firmware. For example, the boundary retrieval circuitry 310 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The database with boundary information 320 stores boundaries that may be associated with a specific geospatial location (e.g., plot of land, jobsite, etc.). The data in the database with boundary information 320 may include the boundary file (e.g., Polygon, geoJSON, wkt, etc.) and the technique used to generate the boundary.

The database with confidence information 325 stores confidence scores for a boundary generation technique. The confidence score for a given boundary depends on an attribute of that boundary. The attribute may be the technique of generation of that boundary.

The data from the database with boundary information 320 and database with confidence information 325 is sent together to the boundary confidence circuitry 335.

These example databases 320, 325, and 330, may be one or more mass storage discs or devices to store firmware, software, and/or data. Examples of such mass storage discs or devices 320, 325, and 330, include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

Lastly, the boundary retrieval circuitry 310 may employ boundary generation circuitry 315. The boundary generation circuitry 315 generates boundaries for the specific machine operation or land data supplied. The boundaries may be made through various algorithms depending on available data. For example, the boundaries may be based on satellite images, convex or concave hulls of machine operations, geometric operations on machine operations, etc. The circumstances that may trigger the boundary generation circuitry 315 include if there are no existing boundaries for a plot of land, jobsite, land area, etc., and if there is a new machine operation data without a boundary. The boundary generation circuitry 315 assigns a default error score (e.g., confidence measure) to each boundary generation technique that is paired with the boundary after the boundary is generated. In some examples, the boundary generation circuitry 315 is instantiated, in part, by programmable circuitry executing boundary generation instructions and/or configured to perform operations such as those represented by the flowchart of FIG. 9 (blocks 910-950).

In some examples, the soft boundary generation circuitry 240 includes means for generating a boundary. For example, the means for generating the boundary may be implemented by boundary generation circuitry 315. In some examples, the boundary generation circuitry 315 may be instantiated by programmable circuitry such as the example programmable circuitry 1412 of FIG. 14. For instance, the boundary generation circuitry 315 may be instantiated by the example microprocessor 1500 of FIG. 15 executing machine executable instructions such as those implemented by at least blocks 910-950 of FIG. 9. In some examples, the boundary generation circuitry 315 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the boundary generation circuitry 315 may be instantiated by any other combination of hardware, software, and/or firmware. For example, the boundary generation circuitry 315 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Once the boundary retrieval circuitry 310 retrieves relevant data concerning the requested plot of land, the process proceeds to boundary confidence circuitry 335. The boundary confidence circuitry 335 combines the boundaries with their error scores. The error scores are determined based on the technique used to generate the boundary. Then, the boundary confidence circuitry 335 sends the paired boundaries to the soft boundary generation circuitry 340. In some examples, the boundary confidence circuitry 335 is instantiated, in part, by programmable circuitry executing boundary confidence instructions and/or configured to perform operations such as those represented by the flowchart of FIG. 9 (blocks 950).

In some examples, the soft boundary generation circuitry 240 includes means for combining a boundary with an error score. For example, the means for combining the boundary with the error score may be implemented by boundary confidence circuitry 335. In some examples, the boundary confidence circuitry 335 may be instantiated by programmable circuitry such as the example programmable circuitry 1412 of FIG. 14. For instance, the boundary confidence circuitry 335 may be instantiated by the example microprocessor 1500 of FIG. 15 executing machine executable instructions such as those implemented by at least block 950 of FIG. 9. In some examples, the boundary confidence circuitry 335 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the boundary confidence circuitry 335 may be instantiated by any other combination of hardware, software, and/or firmware. For example, the boundary confidence circuitry 335 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Using the output of the boundary confidence circuitry 335, soft boundary generation circuitry 340 generates a soft boundary. The soft boundary generation circuitry 340 may use the inputted data (e.g., boundaries and associated default confidence scores for those boundaries) and combine them into the soft boundary. In some examples, the soft boundary generation circuitry 340 utilizes probabilistic boundary generation circuitry 345 and soft boundary combination circuitry 350 to generate the soft boundary. In some examples, the soft boundary generation circuitry 340 is instantiated, in part, by programmable circuitry executing soft boundary generation instructions and/or configured to perform operations such as those represented by the flowchart of FIG. 9 (blocks 970-990).

In some examples, the soft boundary generation circuitry 240 includes means for generating a soft boundary. For example, the means for generating the soft boundary may be implemented by soft boundary generation circuitry 340. In some examples, the soft boundary generation circuitry 340 may be instantiated by programmable circuitry such as the example programmable circuitry 1412 of FIG. 14. For instance, the soft boundary generation circuitry 340 may be instantiated by the example microprocessor 1500 of FIG. 15 executing machine executable instructions such as those implemented by at least blocks 970-990 of FIG. 9. In some examples, the soft boundary generation circuitry 340 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the soft boundary generation circuitry 340 may be instantiated by any other combination of hardware, software, and/or firmware. For example, the soft boundary generation circuitry 340 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

First, the soft boundary generation circuitry 340 sends the inputted data (e.g., boundaries and default confidence scores for those boundaries) to the probabilistic boundary generation circuitry 345 which generates a probabilistic boundary for a boundary provided based on its confidence level. As discussed above, these probabilistic boundaries may take several embodiments. In some examples, the probabilistic boundary generation circuitry 345 is instantiated, in part, by programmable circuitry executing probabilistic boundary generation instructions and/or configured to perform operations such as those represented by the flowchart of FIG. 9 (blocks 970).

In some examples, the soft boundary generation circuitry 240 includes means for generating a probabilistic boundary. For example, the means for generating the probabilistic boundary may be implemented by probabilistic boundary generation circuitry 345. In some examples, the probabilistic boundary generation circuitry 345 may be instantiated by programmable circuitry such as the example programmable circuitry 1412 of FIG. 14. For instance, the probabilistic boundary generation circuitry 345 may be instantiated by the example microprocessor 1500 of FIG. 15 executing machine executable instructions such as those implemented by at least block 970 of FIG. 9. In some examples, the probabilistic boundary generation circuitry 345 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the probabilistic boundary generation circuitry 345 may be instantiated by any other combination of hardware, software, and/or firmware. For example, the probabilistic boundary generation circuitry 345 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Next, the soft boundary generation circuitry 340 sends the probabilistic boundary to the soft boundary combination circuitry 350. The soft boundary combination circuitry 350 combines all the probabilistic boundaries for the user requested plot of land into a single object (e.g., distribution). The soft boundary combination circuitry 350 may assign weights to certain probabilistic boundaries depending on their confidence scores (e.g., error). Then, the soft boundary combination circuitry 350 may layer the distributions, and combine the distributions across the boundary using a weighted combination technique. Once the soft boundary is generated, the soft boundary may be stored in a database with soft boundary 352. In some examples, the database with soft boundary 352 may be instantiated as one or more databases with the example databases 320, 325, and 330. In some examples, the soft boundary combination circuitry 350 and the database with soft boundary information 352 are instantiated, in part, by programmable circuitry executing soft boundary combination and storage instructions and/or configured to perform operations such as those represented by the flowchart of FIG. 9 (blocks 980 and 990, respectively).

In some examples, the soft boundary generation circuitry 240 includes means for combining probabilistic boundaries. For example, the means for combining probabilistic boundaries may be implemented by soft boundary combination circuitry 350. In some examples, the soft boundary combination circuitry 350 may be instantiated by programmable circuitry such as the example programmable circuitry 1412 of FIG. 14. For instance, the soft boundary combination circuitry 350 may be instantiated by the example microprocessor 1500 of FIG. 15 executing machine executable instructions such as those implemented by at least blocks 980-990 of FIG. 9. In some examples, the soft boundary combination circuitry 350 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the soft boundary combination circuitry 350 may be instantiated by any other combination of hardware, software, and/or firmware. For example, the soft boundary combination circuitry 350 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Once the combined soft boundary is generated, the combined boundary is sent to threshold application circuitry 355. The threshold application circuitry 355 may receive a user requested threshold parameter from the threshold entry circuitry 360. The threshold parameter may be entered by a user. The threshold may be entered via keyboard input, sliding bar, selection from a list of options, programmatically through an API, or any other method. However, if there is not a user requested threshold, the threshold application circuitry 355 applies a default threshold parameter (e.g., default confidence threshold). In some examples, the threshold entry circuitry 360 and the threshold application circuitry 355 are instantiated, in part, by programmable circuitry executing threshold entry and application instructions and/or configured to perform operations such as those represented by the flowchart of FIG. 10 (blocks 1010-1020).

In some examples, the soft boundary generation circuitry 240 includes means for receiving an entered threshold. For example, the means for receiving the entered threshold may be implemented by threshold entry circuitry 360. In some examples, the threshold entry circuitry 360 may be instantiated by programmable circuitry such as the example programmable circuitry 1412 of FIG. 14. For instance, the threshold entry circuitry 360 may be instantiated by the example microprocessor 1500 of FIG. 15 executing machine executable instructions such as those implemented by at least block 1010 of FIG. 10. In some examples, the threshold entry circuitry 360 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the threshold entry circuitry 360 may be instantiated by any other combination of hardware, software, and/or firmware. For example, the threshold entry circuitry 360 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the soft boundary generation circuitry 240 includes means for applying a threshold to a soft boundary. For example, the means for applying the threshold to the soft boundary may be implemented by threshold application circuitry 355. In some examples, the threshold application circuitry 355 may be instantiated by programmable circuitry such as the example programmable circuitry 1412 of FIG. 14. For instance, the threshold application circuitry 355 may be instantiated by the example microprocessor 1500 of FIG. 15 executing machine executable instructions such as those implemented by at least block 1020 of FIG. 10. In some examples, the threshold application circuitry 355 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the threshold application circuitry 355 may be instantiated by any other combination of hardware, software, and/or firmware. For example, the threshold application circuitry 355 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The threshold application circuitry 355 sends the soft boundary and the threshold parameter to contour generation circuitry 365. The contour generation circuitry 365 generates a contour. In some examples, the contour generation circuitry 365 generates the contour by calculating the contour and preparing to display the contour. In some examples, the contour generation circuitry 365 utilizes contour calculation circuitry 370 and contour display circuitry 375 to calculate and prepare to display the contour. In some examples, the contour generation circuitry 365 is instantiated, in part, by programmable circuitry executing contour generation instructions and/or configured to perform operations such as those represented by the flowchart of FIG. 10 (blocks 1030-1040).

In some examples, the soft boundary generation circuitry 240 includes means for generating a contour. For example, the means for generating the contour may be implemented by contour generation circuitry 365. In some examples, the contour generation circuitry 365 may be instantiated by programmable circuitry such as the example programmable circuitry 1412 of FIG. 14. For instance, the contour generation circuitry 365 may be instantiated by the example microprocessor 1500 of FIG. 15 executing machine executable instructions such as those implemented by at least blocks 1030-1040 of FIG. 10. In some examples, the contour generation circuitry 365 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the contour generation circuitry 365 may be instantiated by any other combination of hardware, software, and/or firmware. For example, the contour generation circuitry 365 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The contour generation circuitry 365 sends the soft boundary and the threshold parameter to the contour calculation circuitry 370 to compute the contour at the threshold level. The contour generated represents the threshold percentage of the soft boundary. For example, if the threshold parameter is 97% the resultant contour is 97% of the soft boundary. The contour represents a boundary that is 97% confident as the true boundary or the boundary that encloses the plot of land, land, jobsite, or machine operation. As used herein, certainty and uncertainty values are considered complementary values (e.g., in one example, a certainty value of 75% is the same as an uncertainty value of 25%, etc.). In some examples, the contour calculation circuitry 370 is instantiated, in part, by programmable circuitry executing contour calculation instructions and/or configured to perform operations such as those represented by the flowchart of FIG. 10 (block 1030).

In some examples, the soft boundary generation circuitry 240 includes means for calculating a contour. For example, the means for calculating the contour may be implemented by contour calculation circuitry 370. In some examples, the contour calculation circuitry 370 may be instantiated by programmable circuitry such as the example programmable circuitry 1412 of FIG. 14. For instance, the contour calculation circuitry 370 may be instantiated by the example microprocessor 1500 of FIG. 15 executing machine executable instructions such as those implemented by at least block 1030 of FIG. 10. In some examples, the contour calculation circuitry 370 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the contour calculation circuitry 370 may be instantiated by any other combination of hardware, software, and/or firmware. For example, the contour calculation circuitry 370 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Then, the contour display circuitry 375 prepares the contour to be displayed to a user. In some examples, the contour display circuitry 375 can format the contour to be displayed on a mobile device and/or a personal computer. In other examples, the contour display circuitry 375 prepares the contour to be displayed by applying labels and/or a legend for a user to interpret the contour. In some examples, the contour display circuitry 375 is instantiated, in part, by programmable circuitry executing contour display instructions and/or configured to perform operations such as those represented by the flowchart of FIG. 10 (block 1040).

In some examples, the soft boundary generation circuitry 240 includes means for preparing a contour to be displayed. For example, the means for preparing the contour to be displayed may be implemented by contour display circuitry 375. In some examples, the contour display circuitry 375 may be instantiated by programmable circuitry such as the example programmable circuitry 1412 of FIG. 14. For instance, the contour display circuitry 375 may be instantiated by the example microprocessor 1500 of FIG. 15 executing machine executable instructions such as those implemented by at least block 1040 of FIG. 10. In some examples, the contour display circuitry 375 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the contour display circuitry 375 may be instantiated by any other combination of hardware, software, and/or firmware. For example, the contour display circuitry 375 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

After the contour is prepared for display, the contour and soft boundary are sent to the display circuitry 380. The display circuitry 380 receives and displays the prepared contour and soft boundary on a web/mobile application. The web/mobile application may include a map/satellite image of the plot of land and machine operation data displayed alongside the image or on top of it. Additionally or alternatively, the display may include an option for the user to select an alternative threshold parameter to change the contour. Additionally or alternatively, the user may choose to save or discard any given boundary during this stage. In some examples, the display circuitry 380 is instantiated, in part, by programmable circuitry executing display instructions and/or configured to perform operations such as those represented by the flowchart of FIG. 10 (block 1040).

In some examples, the soft boundary generation circuitry 240 includes means for displaying a soft boundary and a contour. For example, the means for displaying the soft boundary and the contour may be implemented by display circuitry 380. In some examples, the display circuitry 380 may be instantiated by programmable circuitry such as the example programmable circuitry 1412 of FIG. 14. For instance, the display circuitry 380 may be instantiated by the example microprocessor 1500 of FIG. 15 executing machine executable instructions such as those implemented by at least block 1040 of FIG. 10. In some examples, the display circuitry 380 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the display circuitry 380 may be instantiated by any other combination of hardware, software, and/or firmware. For example, the display circuitry 380 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

After the boundary and contour are displayed, the user may choose to save the soft boundary and contour in the database with boundary contours 385. As described above, this database may be used by various interfaces (e.g., John Deere OpsCenter) to extract data to display boundaries. In some examples, the database with boundary contours 385 is instantiated, in part, by programmable circuitry executing storage instructions and/or configured to perform operations such as those represented by the flowchart of FIG. 10 (blocks 1050 and 1060).

In some examples, the soft boundary generation circuitry 240 includes means for storing a boundary and a contour. For example, the means for storing the soft boundary and the contour may be implemented by database with boundary contours 385. In some examples, the database with boundary contours 385 may be instantiated by programmable circuitry such as the example programmable circuitry 1412 of FIG. 14. For instance, the database with boundary contours 385 may be instantiated by the example microprocessor 1500 of FIG. 15 executing machine executable instructions such as those implemented by at least blocks 1050-1060 of FIG. 10. In some examples, the database with boundary contours 385 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the database with boundary contours 385 may be instantiated by any other combination of hardware, software, and/or firmware. For example, the database with boundary contours 385 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Then, boundary exporter circuitry 390 may poll the database with boundary contours 385 to display a given boundary upon a user request. The user request may include a request to send a boundary to a machine or mobile display. The boundary exporter circuitry 390 may receive a request for a boundary from a mobile display/machine and prepare the boundary data to be sent to the mobile display/machine. In some examples, the boundary exporter circuitry 390 is instantiated, in part, by programmable circuitry executing boundary export instructions and/or configured to perform operations such as those represented by the flowchart of FIG. 10 (block 1070).

In some examples, the soft boundary generation circuitry 240 includes means for exporting a boundary to a display. For example, the means for exporting the boundary to the display may be implemented by boundary exporter circuitry 390. In some examples, the boundary exporter circuitry 390 may be instantiated by programmable circuitry such as the example programmable circuitry 1412 of FIG. 14. For instance, the boundary exporter circuitry 390 may be instantiated by the example microprocessor 1500 of FIG. 15 executing machine executable instructions such as those implemented by at least block 1070 of FIG. 10. In some examples, the boundary exporter circuitry 390 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the boundary exporter circuitry 390 may be instantiated by any other combination of hardware, software, and/or firmware. For example, the boundary exporter circuitry 390 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Lastly, upon receiving the prepared boundary data for display from the boundary exporter circuitry 390, the mobile display circuitry 395 may display the boundary and contour to the user. The output device(s) of the display circuitry 395 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. In some examples, the mobile display circuitry 395 is instantiated, in part, by programmable circuitry executing mobile display instructions and/or configured to perform operations such as those represented by the flowchart of FIG. 10 (block 1080).

In some examples, the soft boundary generation circuitry 240 includes means for displaying a boundary and a contour. For example, the means for displaying the boundary and the contour may be implemented by mobile display circuitry 395. In some examples, the mobile display circuitry 395 may be instantiated by programmable circuitry such as the example programmable circuitry 1412 of FIG. 14. For instance, the mobile display circuitry 395 may be instantiated by the example microprocessor 1500 of FIG. 15 executing machine executable instructions such as those implemented by at least block 1080 of FIG. 10. In some examples, the mobile display circuitry 395 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the mobile display circuitry 395 may be instantiated by any other combination of hardware, software, and/or firmware. For example, the mobile display circuitry 395 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the soft boundary generation circuitry 240 of FIG. 2 is illustrated in FIG. 3, one or more of the elements, processes, and/or devices illustrated in FIG. 3 may be combined, divided, re-arranged, omitted, eliminated, and/or implemented in any other way. Further, the boundary retrieval circuitry 310, the boundary generation circuitry 315, the database with boundary information 320, the database with confidence information 325, the database with soft boundary information 330, the boundary confidence circuitry 335, the soft boundary generation circuitry 340, the probabilistic boundary generation circuitry 345, the soft boundary combination circuitry 350, the database with soft boundary 352, the threshold application circuitry 355, the threshold interface 360, the contour generation circuitry 365, the contour calculation circuitry 370, the contour display circuitry 375, the display circuitry 380, the database with boundary contours 385, the boundary exporter circuitry 390, the mobile display circuitry 395, and/or, more generally, the example soft boundary generation circuitry 240 of FIG. 3, may be implemented by hardware alone or by hardware in combination with software and/or firmware. Thus, for example, any of the boundary retrieval circuitry 310, the boundary generation circuitry 315, the database with boundary information 320, the database with confidence information 325, the database with soft boundary information 330, the boundary confidence circuitry 335, the soft boundary generation circuitry 340, the probabilistic boundary generation circuitry 345, the soft boundary combination circuitry 350, the database with soft boundary 352, the threshold application circuitry 355, the threshold interface 360, the contour generation circuitry 365, the contour calculation circuitry 370, the contour display circuitry 375, the display circuitry 380, the database with boundary contours 385, the boundary exporter circuitry 390, the mobile display circuitry 395, and/or, more generally, the example soft boundary generation circuitry 240 of FIG. 3, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example soft boundary generation circuitry 240 of FIG. 3 may include one or more elements, processes, and/or devices in addition to, or instead of, those illustrated in FIG. 3, and/or may include more than one of any or all of the illustrated elements, processes and devices.

Figure 4B:
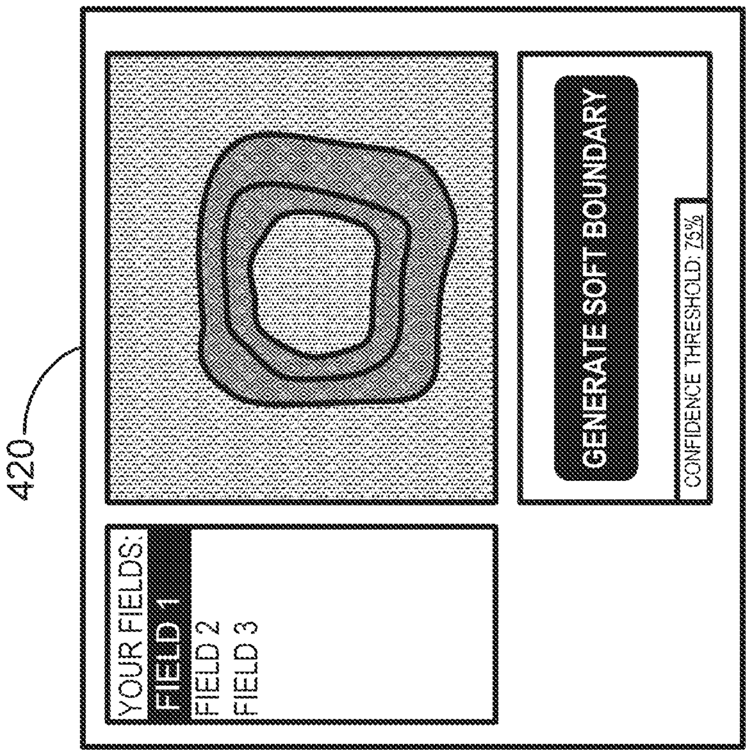
FIGS. 4A and 4B are diagrams representative of example outputs to an example interface from the soft boundary generation circuitry of FIG. 2.
Figure 4A:
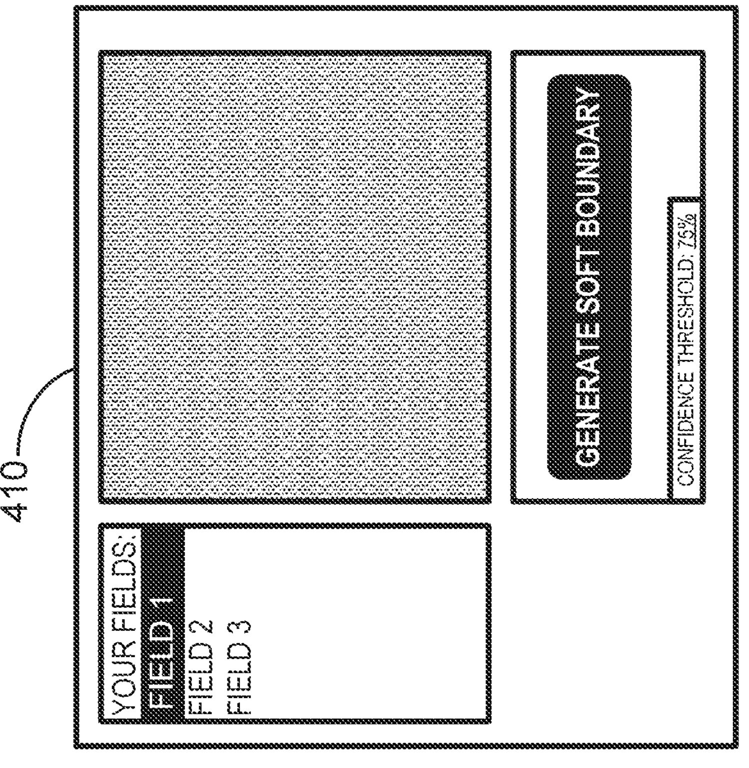

FIGS. 4A and 4B are representative of example displays of the mobile display circuitry 395. FIG. 4A shows the display 410 before the boundary exporter circuitry 390 sends a boundary and contour for display to the mobile display circuitry 395. Furthermore, the selected user threshold is 75% 410. Then, once the boundary exporter circuitry 390 sends a boundary and contour for display to the mobile display circuitry 395, the display updates 420, as shown in FIG. 4B, with a soft boundary and contour at the selected threshold 75%. The user request for a soft boundary 305 may be instantiated by pressing the button "Generate Soft Boundary."

Figure 5A:
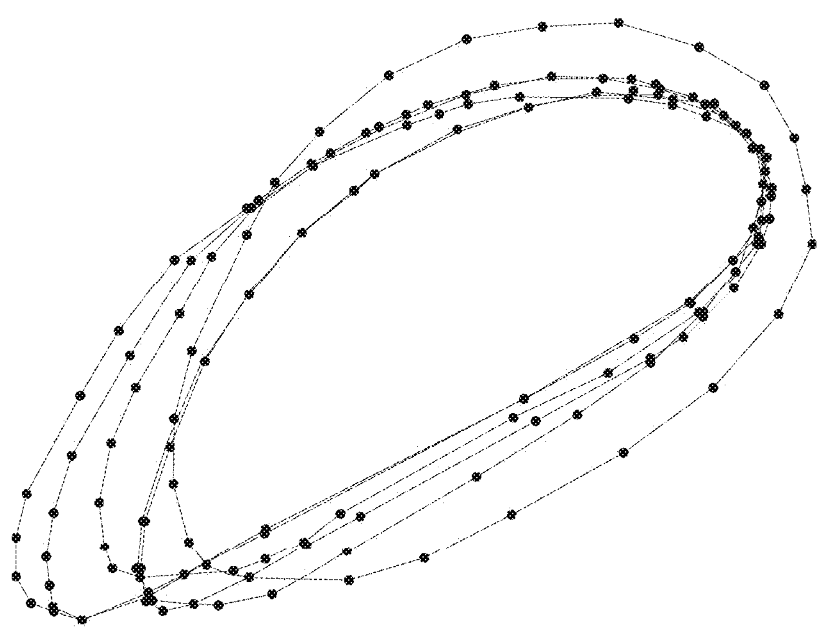
FIGS. 5A-5E are diagrams representative of a first example soft boundary generated by the soft boundary generation circuitry of FIG. 2 with varying example confidence thresholds to generate example contour boundaries.
Figure 5B:
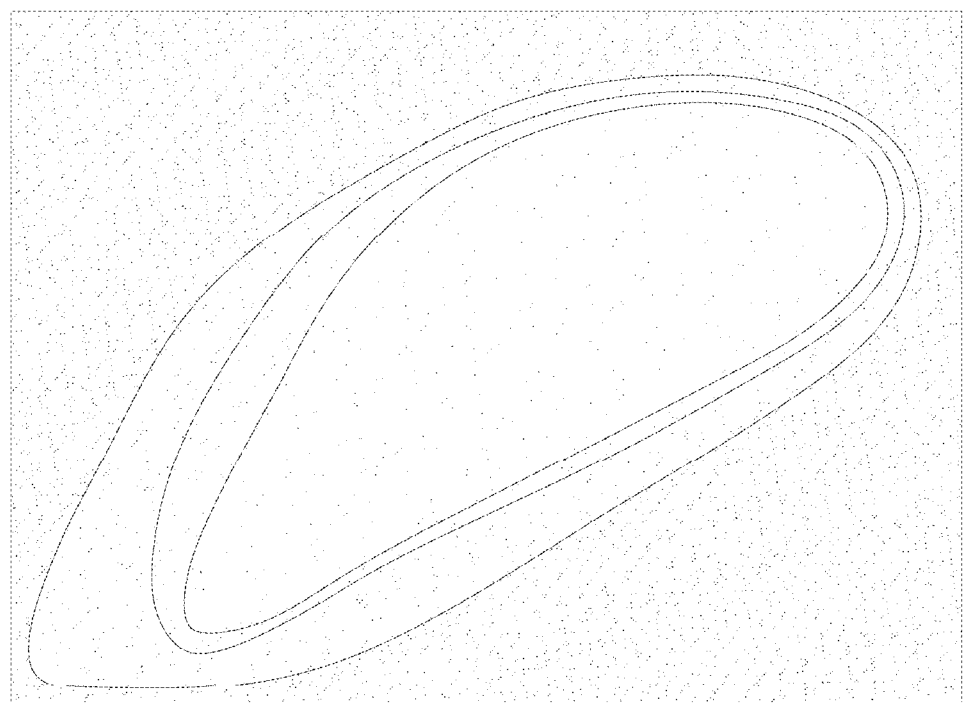
Figure 5C:
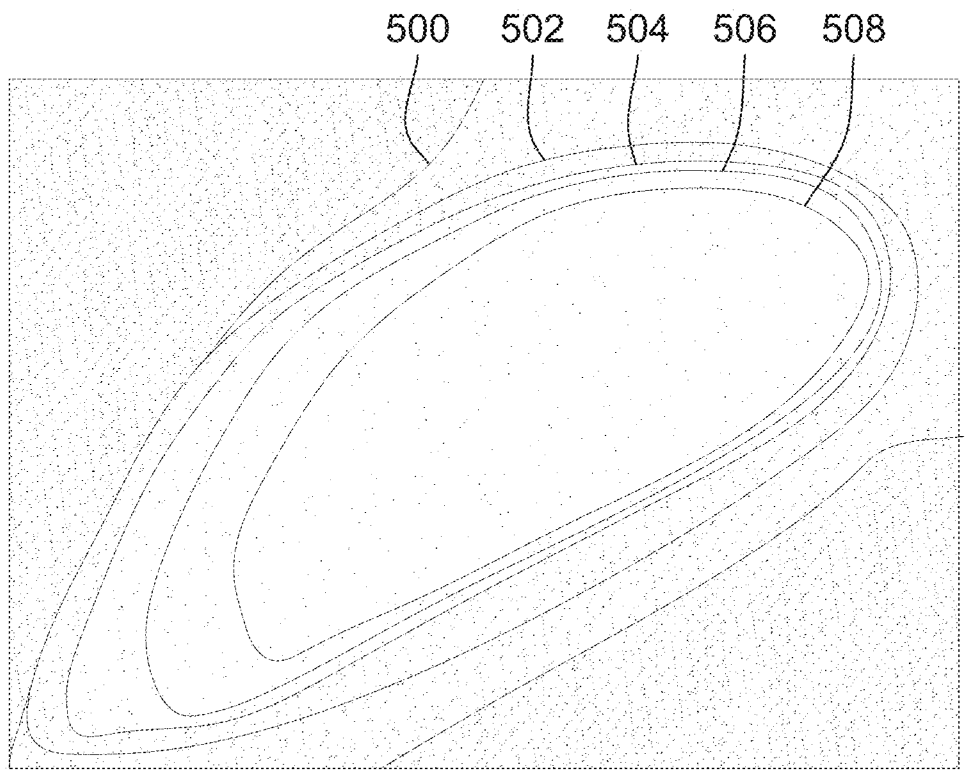
Figure 5D:
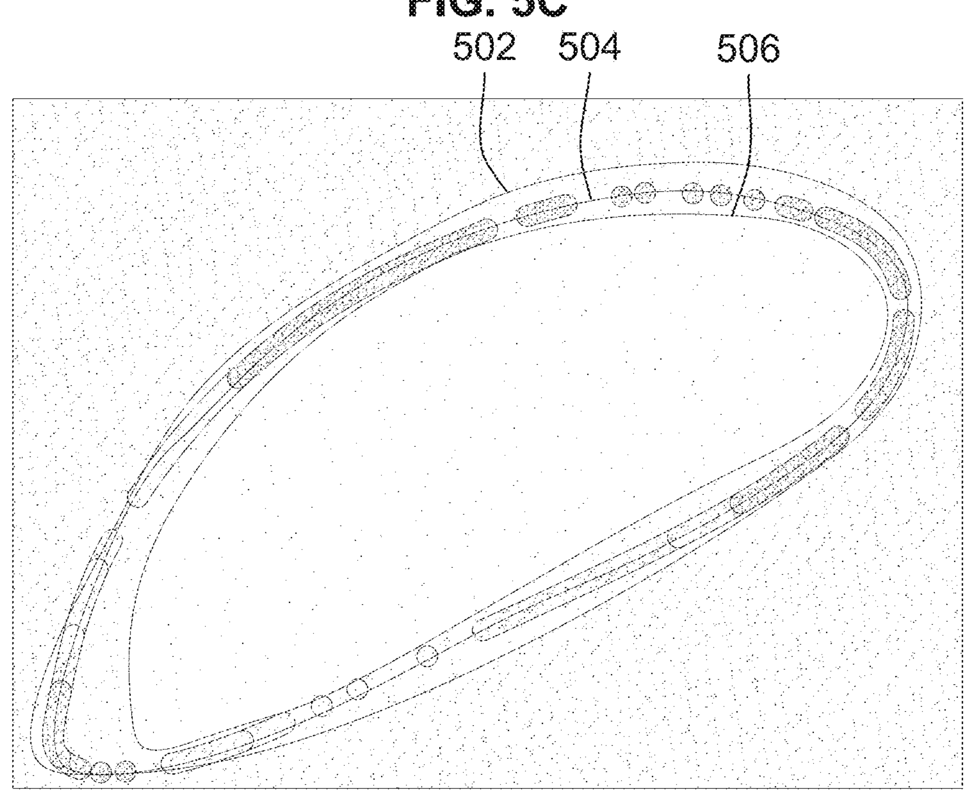
Figure 5E:
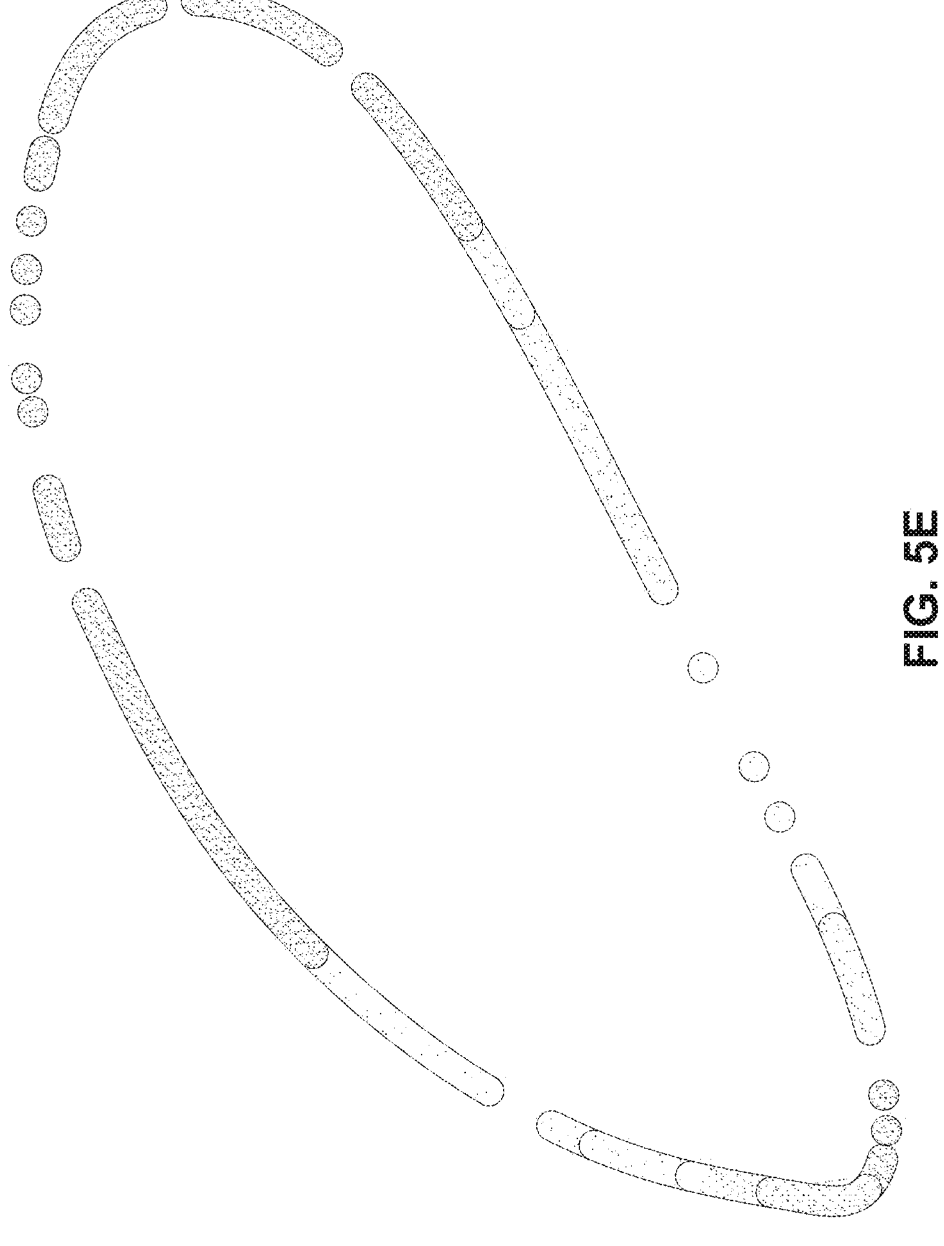

FIGS. 5A-5E show an example graphic representation of the generation of a soft boundary. FIG. 5A shows several boundaries for the same area that are retrieved and/or generated by the boundary retrieval circuitry 310. In FIG. 5B, the boundaries are combined to form a soft boundary. FIG. 5B represents a combination where all boundaries are assigned equal confidence scores, and, therefore, have equal weights in combination. FIG. 5C represents several confidence contours of the soft boundary of FIG. 5B. From outermost to innermost contour, the threshold values are 5% (500), 25% (502), 50% (504), 75% (506), and 95% (508) confidence. FIG. 5D shows the contours for 25% (502), 50% (504), and 75% (506). The 50% contour (504) is gradated based on the distances between the 25% (502) and 75% (506) contours (e.g., the interquartile range). Lastly, FIG. 5E displays the 50% (504) alone with each point along the contour gradated based on the distance between the 25% (502) and 75% (506) contours.

Figure 6:
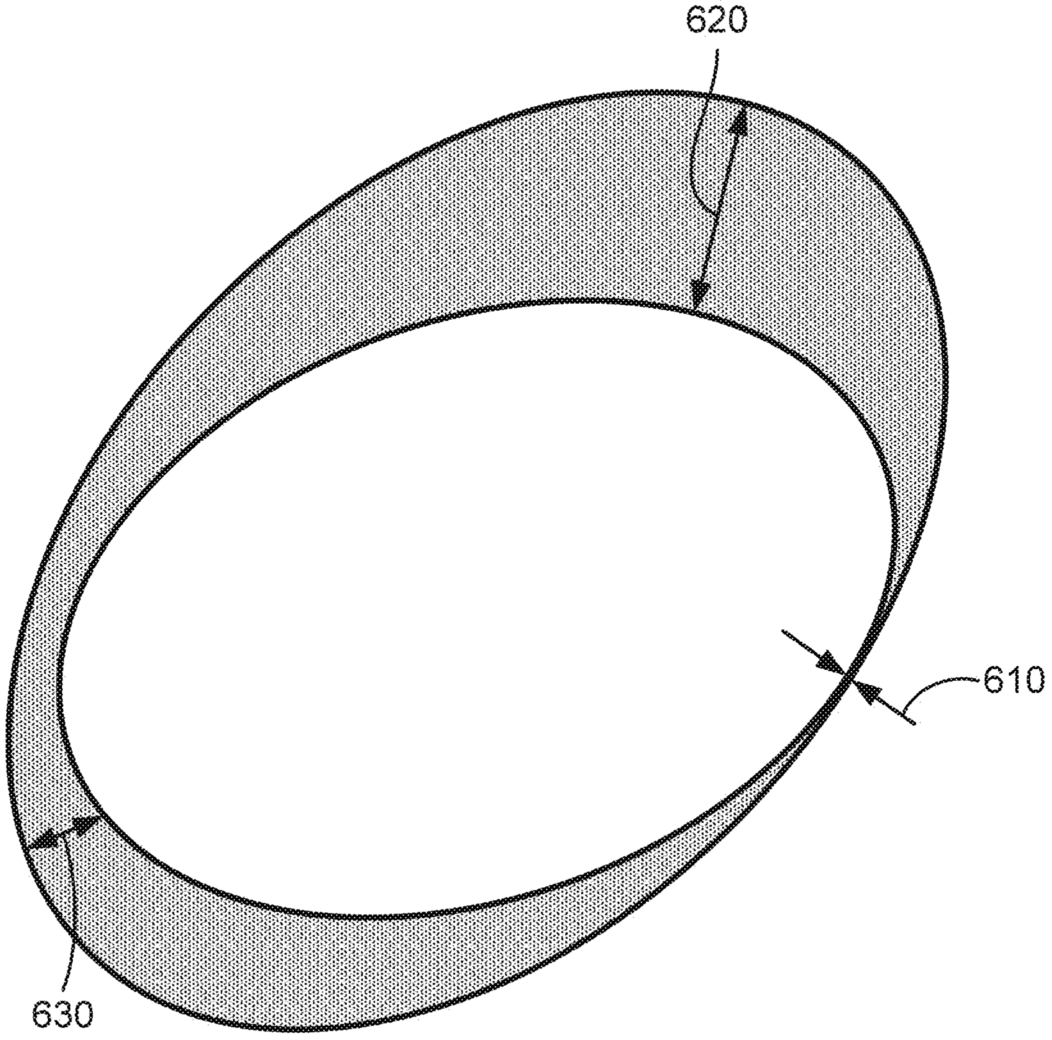
FIG. 6 is a diagram representative of a second example soft boundary generated by the soft boundary generation circuitry of FIG. 2 with varying example confidence levels.

FIG. 6 is a graphic representation of a soft boundary represented as a probability distribution around the boundary line based on the confidence per each point. 610 represents an area of the boundary where confidence is high. Conversely, 620 is an area of the boundary where the confidence is low. Lastly, 630 is an area where the confidence is medium for that boundary point.

Flowcharts representative of example machine-readable instructions, which may be executed by programmable circuitry to implement and/or instantiate the soft boundary generation circuitry 240 of FIG. 3 and/or representative of example operations which may be performed by programmable circuitry to implement and/or instantiate the soft boundary generation circuitry 240 of FIG. 3, are shown in FIGS. 7-10. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer-readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer-readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer-readable storage medium may include one or more mediums. Further, although the example program is described with reference to the flowchart(s) illustrated in FIGS. 7-10, many other methods of implementing the example soft boundary generation may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer-readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-10 may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. Examples of such non-transitory computer-readable medium, non-transitory computer-readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer-readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

Figure 7:
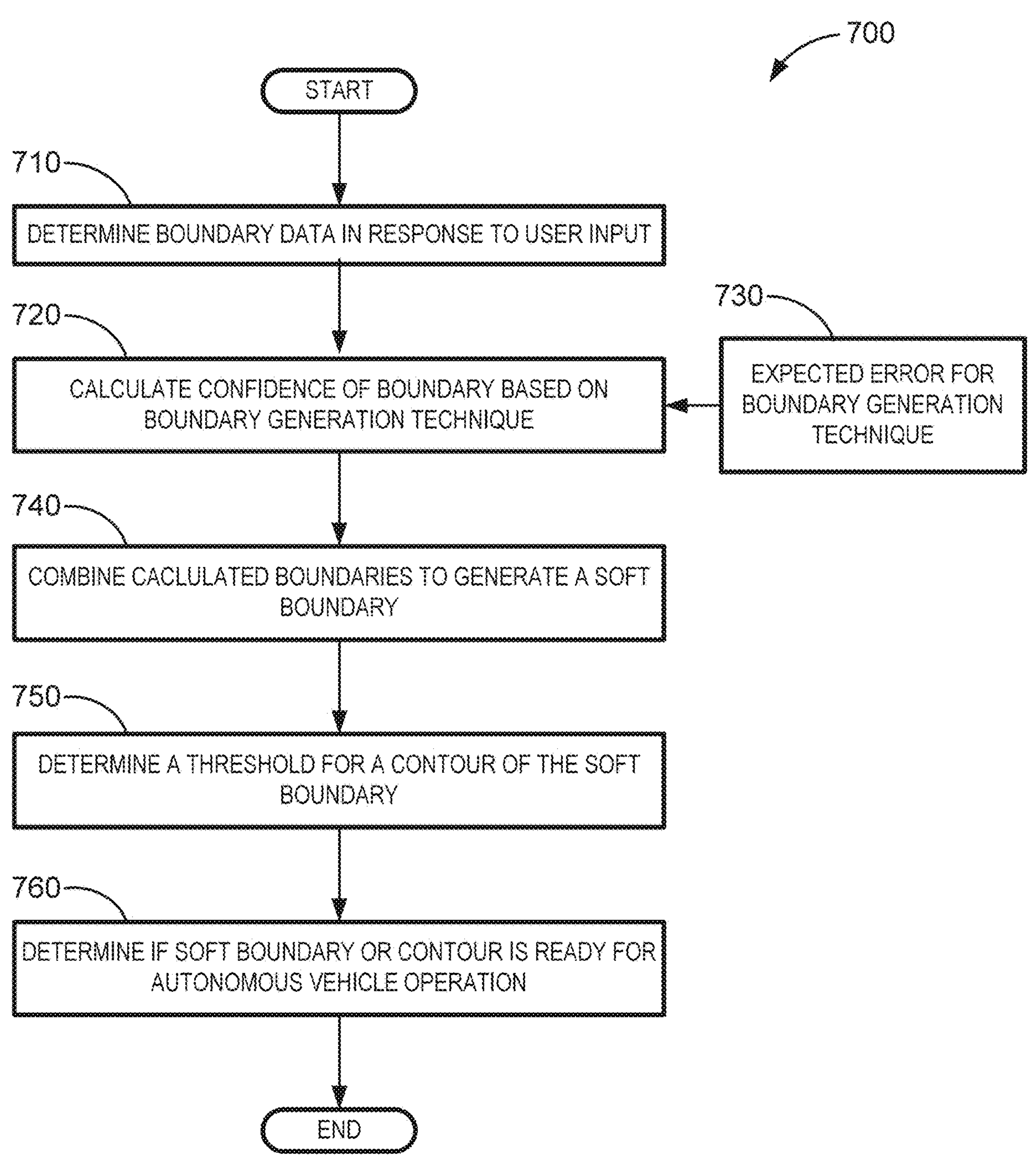
FIG. 7 is a first flowchart representative of example machine-readable instructions and/or example operations that may be executed, instantiated, and/or performed by example programmable circuitry to implement the soft boundary generation circuitry of FIG. 2.

FIG. 7 is a flowchart representative of an example implementation 700 of the server 130 of FIG. 1 to perform the soft boundary generation circuitry 240 of FIG. 3. The process begins with block 710 where a user request for a soft boundary may be received. In block 710, boundary data is determined for a specific plot of land responsive to a user input, or a user request.

In block 720, the boundary data is matched to an expected error (block 730) based on the technique of boundary generation used to collect the boundary data. After the boundary data is matched to an expected error at block 720, the confidence of the boundary is calculated from these values at block 730. The calculation of boundary confidence generates a weight that will be used to combine boundaries. The calculation of boundary confidence results in a probabilistic boundary (e.g., a distribution of each boundary). A probabilistic boundary, as described herein, may be defined as boundary where each point along the boundary has a distribution of possible locations. There are various embodiments for a probabilistic boundary. In one example, a probabilistic boundary may be a probability distribution around the boundary line depending on the confidence (e.g., error) in how the boundary is generated. In this example, there may be a wide band where the boundary is less confident (e.g., high error) and a skinny band where the boundary is more confident (e.g., low error). In another example, the probabilistic boundary may be a probability blur (e.g., a Gaussian blur) to a polygon representing the plot of land with the mean and variance of the distribution varying based on the confidence of the boundary generation technique.

After a probabilistic boundary is generated for boundaries responsive to the user input, the process proceeds to block 740 where the probabilistic boundaries are layered together to generate a soft boundary. In some examples, the probabilistic boundaries are layered together by taking a weighted sum of each probability distribution of each probabilistic boundary.

After the soft boundary is generated, a threshold (e.g., a confidence threshold) is applied to the soft boundary to generate a contour (block 750) (e.g., where the contour represents the layer of the soft boundary corresponding to the confidence percentage of the threshold). The threshold may be a user chosen threshold or may be a default threshold. Then, the process terminates at block 760 with a determination of whether the generated soft boundary or contour is sufficiently confident for autonomous vehicle operation (e.g., ready for autonomy). In some examples, the determination of whether the generated soft boundary and or contour is sufficiently confidence for autonomous vehicle operation is based on the threshold.

Figure 8:
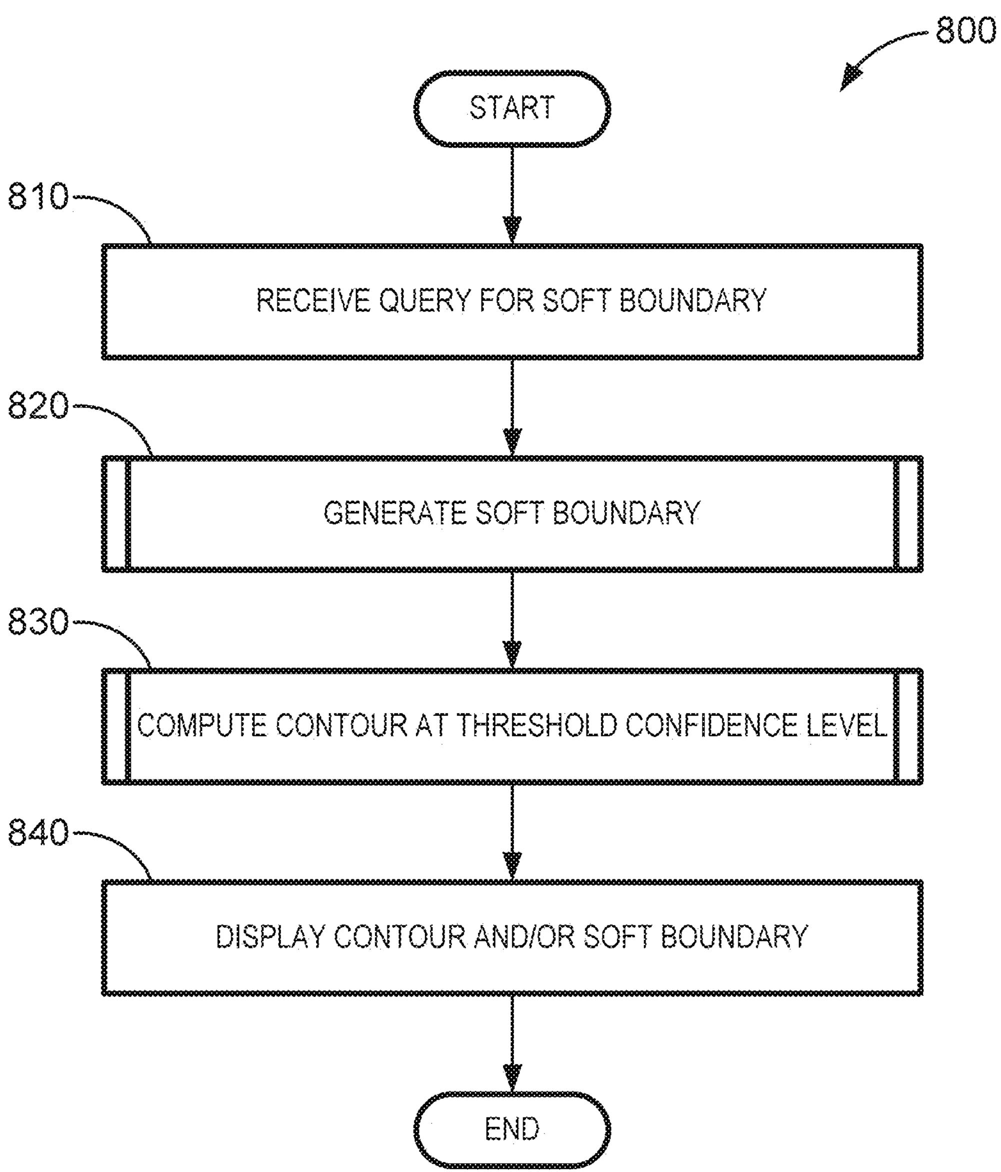
FIG. 8 is a second flowchart representative of example machine-readable instructions and/or example operations that may be executed, instantiated, and/or performed by example programmable circuitry to implement the generation of a soft boundary by the soft boundary generation circuitry of FIG. 2.

FIG. 8 is a flowchart representative of example machine-readable instructions and/or example operations 800 that may be executed, instantiated, and/or performed by programmable circuitry to perform soft boundary generation. FIG. 8 is a high-level representation of soft boundary generation. The process begins with block 810 where a query for a soft boundary is received. Then, a soft boundary is generated in response to this received query (block 820). After a soft boundary is generated, a contour is computed at a threshold confidence level (830). Last, the contour and/or soft boundary is displayed (block 840).

Figure 9:
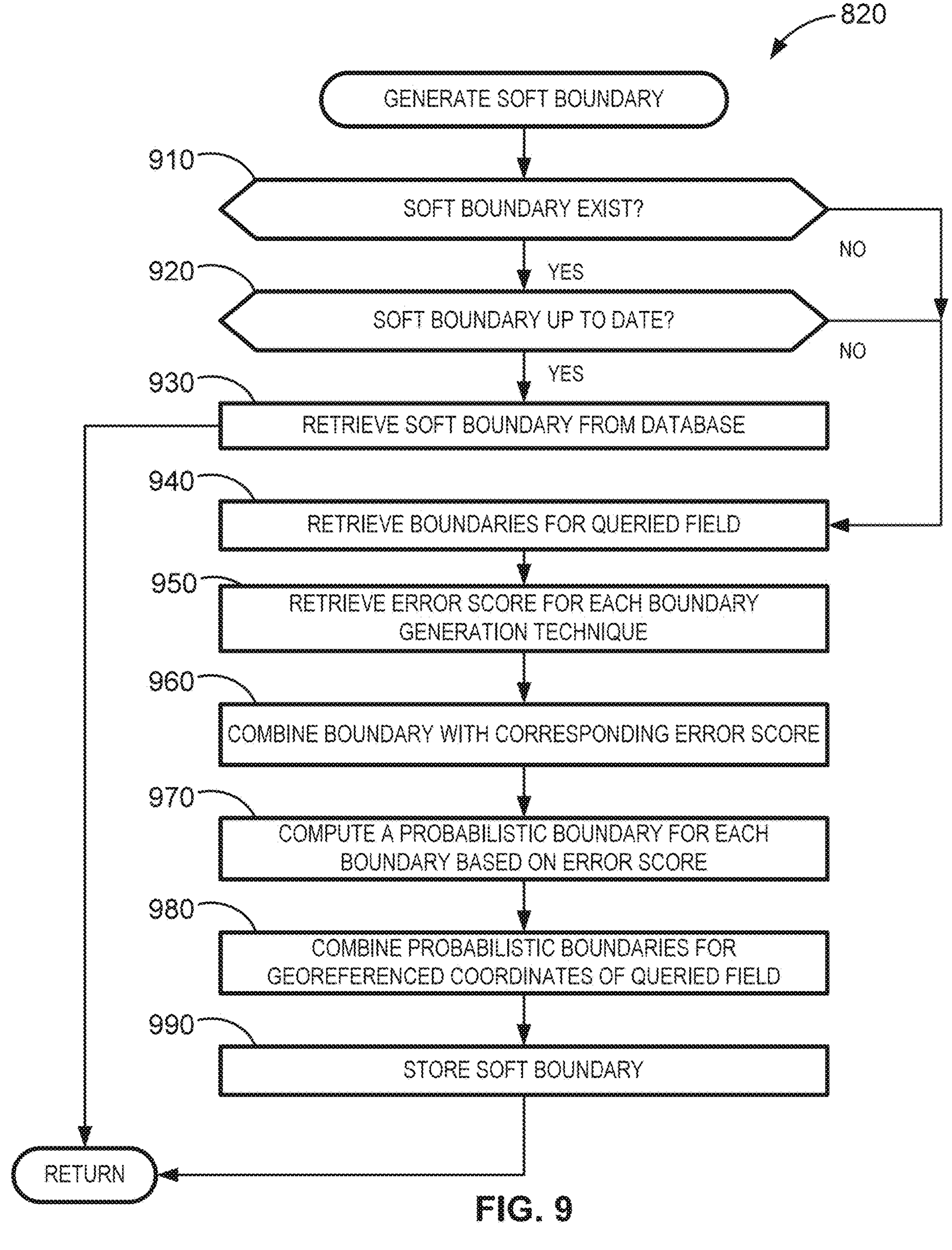
FIG. 9 is a third flowchart representative of example machine-readable instructions and/or example operations that may be executed, instantiated, and/or performed by example programmable circuitry to implement the generation of a soft boundary of FIG. 8.

FIG. 9 is a flowchart representative of example machine-readable instructions and/or example operations 820 that may be executed, instantiated, and/or performed by programmable circuitry to perform soft boundary generation. FIG. 9 starts with a determination of whether a soft boundary exists that corresponds to the plot of land of the user's query (block 910). If the soft boundary exists, then a determination is made whether that soft boundary is up to date (e.g., no new data is available, a predetermined amount of time has not passed since a previous update, etc.). (block 920). If the soft boundary is up to date, then that soft boundary is retrieved from the database (block 930), and the process 820 ends with control returning to block 830 of FIG. 8.

However, if a soft boundary does not already exist (block 910) or is not up to date (block 920), boundaries are retrieved that correspond to the queried plot of land (block 940). As described above, these boundaries may be pulled from a variety of sources (e.g., satellite images, hand-drawn, machine operations, convex and concave hulls of machine operations, geometric operations on machine operations, etc.). Then, a confidence score is retrieved for each boundary pulled in response to the query (block 950). In some examples, the confidence score for a first boundary is a first attribute based on the technique of generation of the first boundary. Further, in these examples, the confidence score of a second boundary is a second attribute based on the technique of generation of the second boundary. Next, the boundary is combined with its corresponding confidence score (block 960). After this combination, a probabilistic boundary is formed for each boundary based on its confidence score (block 970). After, all probabilistic boundaries are combined corresponding to the georeferenced coordinates of the queried plot of land (block 980). In some examples, the probabilistic boundaries may be combined corresponding to the latitude and longitude coordinates of the queried plot of land. This combination of the probabilistic boundaries forms a soft boundary. The soft boundary may then be stored (block 990). After storage, control returns to block 830 of FIG. 8.

Figure 10:
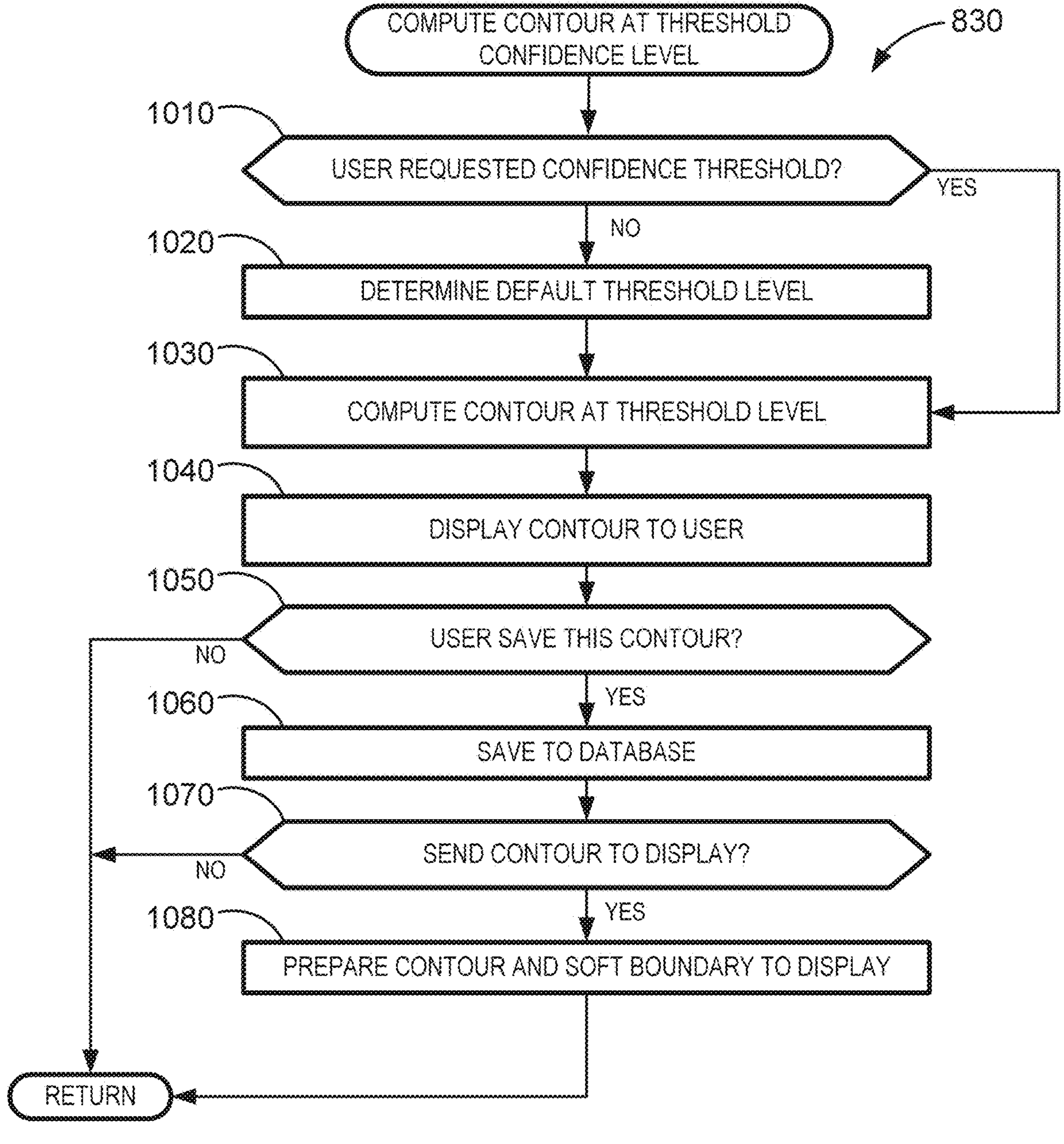
FIG. 10 is a fourth flowchart representative of example machine-readable instructions and/or example operations that may be executed, instantiated, and/or performed by example programmable circuitry to implement the computation of a contour at a threshold confidence level of FIG. 8.

FIG. 10 is a flowchart representative of example machine-readable instructions and/or example operations 830 that may be executed, instantiated, and/or performed by programmable circuitry to perform soft boundary generation. The process begins at block 1010 with a determination of whether there is a user requested confidence threshold. If there is a user requested confidence threshold, the user requested confidence threshold is applied and sent to block 1030. However, if there is not a user requested confidence threshold, a default threshold level is determined (block 1020). Then, using the threshold level, either default or user-specified, a contour is computed for that threshold level (block 1030). At and/or after computation, the contour is displayed to the user (block 1040). The user may choose to save the contour (block 1050). If the contour is not saved, the process ends and control returns to block 840 of FIG. 8. However, if the user chooses to save the contour, the contour is saved to a database (block 1060). Further, the user may choose to send the contour to a display (e.g., machine display, mobile display, etc.) (block 1070). If the user elects not to send the contour to the display, the process ends and control returns to block 840 of FIG. 8. If the user elects to send the contour to the display, the contour and soft boundary are prepared to be displayed (block 1080). Once the contour and soft boundary are prepared for display, the process ends and control returns to block 840 of FIG. 8.

Figure 11:
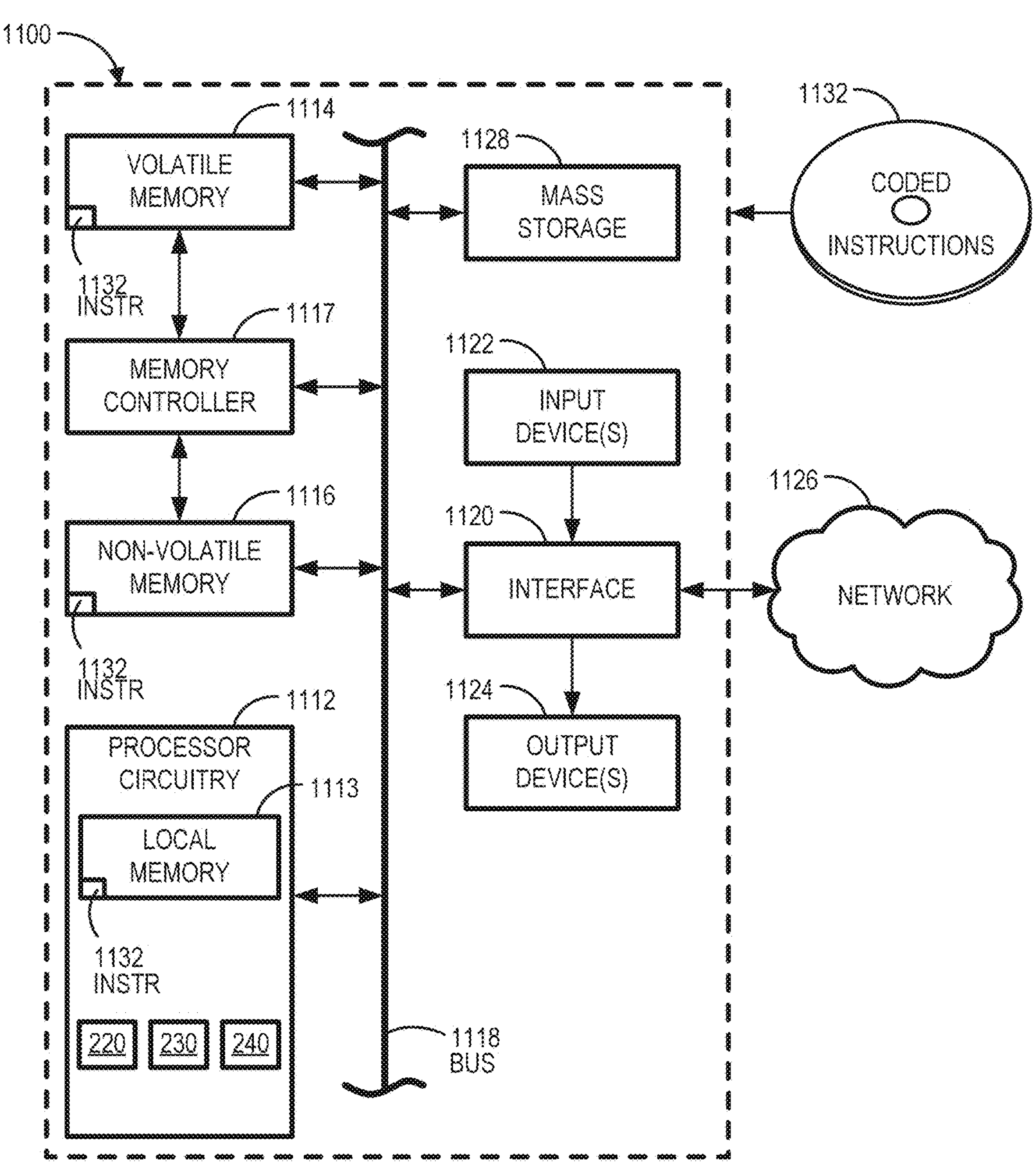
FIG. 11 is a block diagram of an example processing platform including programmable circuitry structured to execute, instantiate, and/or perform the example machine-readable instructions and/or perform the example operations of FIGS. 7-10 to implement the soft boundary generation circuitry of FIG. 2.

FIG. 11 is a block diagram of an example programmable circuitry platform 1100 structured to execute and/or instantiate the example machine-readable instructions and/or the example operations of FIGS. 7-10 to implement the soft boundary generation circuitry of FIG. 2. The programmable circuitry platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1100 of the illustrated example includes programmable circuitry 1112. The programmable circuitry 1112 of the illustrated example is hardware. For example, the programmable circuitry 1112 can be implemented by one or more integrated circuits, logic circuits, FPGAs, microprocessors, CPUs, GPUs, DSPs, and/or microcontrollers from any desired family or manufacturer. The programmable circuitry 1112 may be implemented by one or more semiconductor based (e.g., silicon based) devices. In this example, the programmable circuitry 1112 implements the geospatial compression circuitry 220, the subzone boundary generation circuitry 230, and the soft boundary generation circuitry 240.

The programmable circuitry 1112 of the illustrated example includes a local memory 1113 (e.g., a cache, registers, etc.). The programmable circuitry 1112 of the illustrated example is in communication with main memory 1114, 1116, which includes a volatile memory 1114 and a non-volatile memory 1116, by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated examples is controlled by a memory controller 1117. In some examples, the memory controller 1117 may be implemented by one or more integrated circuits, logic circuits, microcontrollers from any desired family or manufacturer, or any other type of circuitry to manage the flow of data going to and from the main memory 1114, 1116.

The programmable circuitry platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user (e.g., a human user, a machine user, etc.) to enter data and/or commands into the programmable circuitry 1112. The input device(s) 1122 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1100 of the illustrated example also includes one or more mass storage discs or devices 1128 to store firmware, software, and/or data. Examples of such mass storage discs or devices 1128 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 1132, which may be implemented by the machine-readable instructions of FIGS. 7-10, may be stored in the mass storage device 1128, in the volatile memory 1114, in the non-volatile memory 1116, and/or on at least one non-transitory computer-readable storage medium such as a CD or DVD which may be removable.

Figure 12:
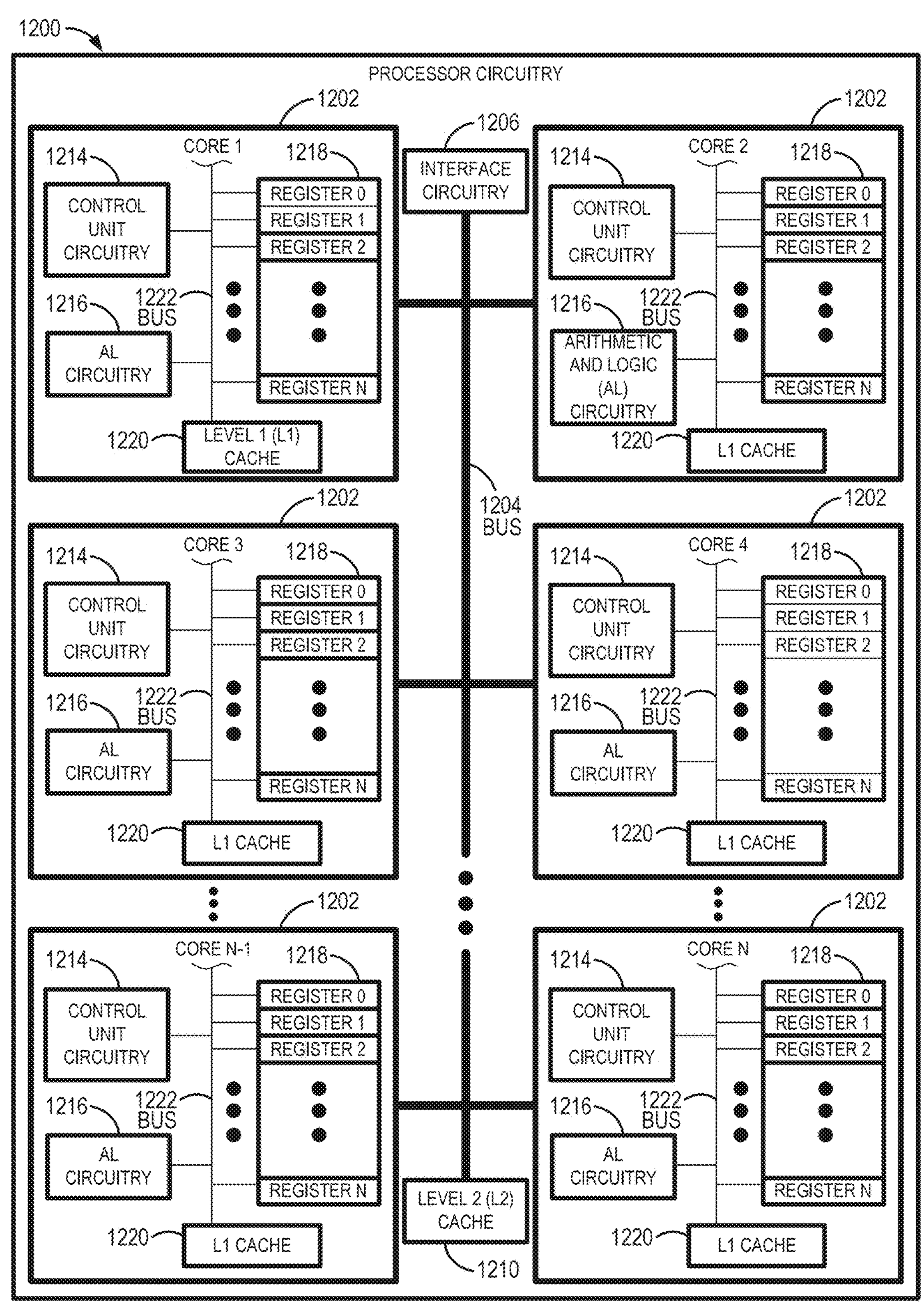
FIG. 12 is a block diagram of an example implementation of the programmable circuitry of FIG. 11.

FIG. 12 is a block diagram of an example implementation of the programmable circuitry 1112 of FIG. 11. In this example, the programmable circuitry 1112 of FIG. 11 is implemented by a microprocessor 1200. For example, the microprocessor 1200 may be a general-purpose microprocessor (e.g., general-purpose microprocessor circuitry). The microprocessor 1200 executes some or all of the machine-readable instructions of the flowcharts of FIGS. 7-10 to effectively instantiate the circuitry of FIG. 2 as logic circuits to perform operations corresponding to those machine-readable instructions. In some such examples, the circuitry of FIG. 2 is instantiated by the hardware circuits of the microprocessor 1200 in combination with the machine-readable instructions. For example, the microprocessor 1200 may be implemented by multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine-readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine-readable instructions and/or operations represented by the flowcharts of FIGS. 7-10.

The cores 1202 may communicate by a first example bus 1204. In some examples, the first bus 1204 may be implemented by a communication bus to effectuate communication associated with one(s) of the cores 1202. For example, the first bus 1204 may be implemented by at least one of an Inter-Integrated Circuit (I2C) bus, a Serial Peripheral Interface (SPI) bus, a PCI bus, or a PCIe bus. Additionally or alternatively, the first bus 1204 may be implemented by any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2 cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the local memory 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer-based operations. In other examples, the AL circuitry 1216 also performs floating-point operations. In yet other examples, the AL circuitry 1216 may include first AL circuitry that performs integer-based operations and second AL circuitry that performs floating-point operations. In some examples, the AL circuitry 1216 may be referred to as an Arithmetic Logic Unit (ALU).

The registers 1218 are semiconductor-based structures to store data and/or instructions such as results of one or more of the operations performed by the AL circuitry 1216 of the corresponding core 1202. For example, the registers 1218 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure, such as by being distributed throughout the core 1202 to shorten access time. The second bus 1222 may be implemented by at least one of an I2C bus, a SPI bus, a PCI bus, or a PCIe bus.

Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages.

The microprocessor 1200 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1200, in the same chip package as the microprocessor 1200 and/or in one or more separate packages from the microprocessor 1200.

Figure 13:
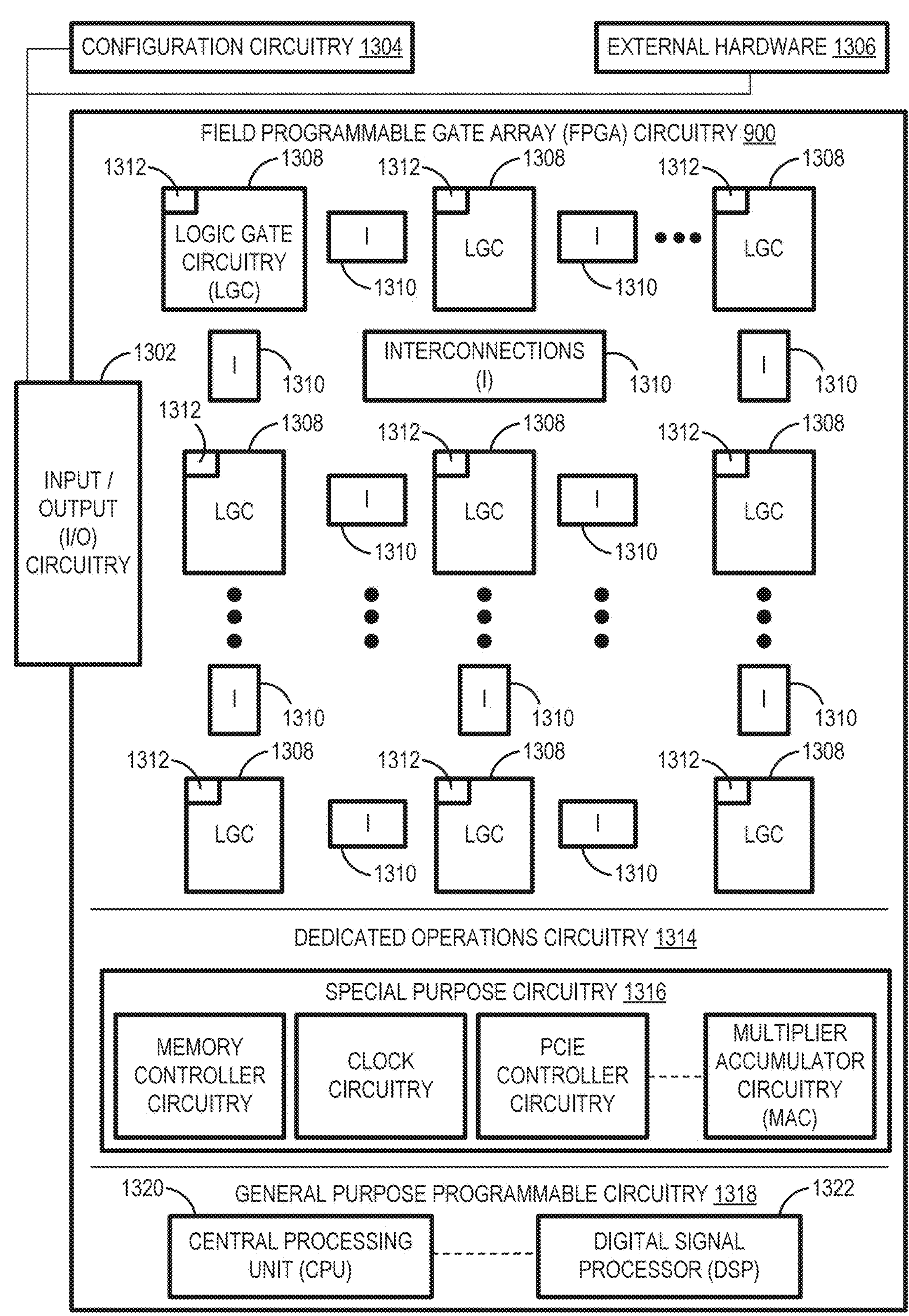
FIG. 13 is a block diagram of another example implementation of the programmable circuitry of FIG. 11.

FIG. 13 is a block diagram of another example implementation of the programmable circuitry 1112 of FIG. 11. In this example, the programmable circuitry 1112 is implemented by FPGA circuitry 1300. For example, the FPGA circuitry 1300 may be implemented by an FPGA. The FPGA circuitry 1300 can be used, for example, to perform operations that could otherwise be performed by the example microprocessor 1200 of FIG. 12 executing corresponding machine-readable instructions. However, once configured, the FPGA circuitry 1300 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 1200 of FIG. 12 described above (which is a general purpose device that may be programmed to execute some or all of the machine-readable instructions represented by the flowchart(s) of FIGS. 7-10 but whose interconnections and logic circuitry are fixed once fabricated), the FPGA circuitry 1300 of the example of FIG. 13 includes interconnections and logic circuitry that may be configured, structured, programmed, and/or interconnected in different ways after fabrication to instantiate, for example, some or all of the operations/functions corresponding to the machine-readable instructions represented by the flowchart(s) of FIGS. 7-10. In particular, the FPGA circuitry 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 7-10. As such, the FPGA circuitry 1300 may be configured and/or structured to effectively instantiate some or all of the operations/functions corresponding to the machine-readable instructions of the flowchart(s) of FIGS. 7-10 as dedicated logic circuits to perform the operations/functions corresponding to those software instructions in a dedicated manner analogous to an ASIC. Therefore, the FPGA circuitry 1300 may perform the operations/functions corresponding to the some or all of the machine-readable instructions of FIGS. 7-10 faster than the general-purpose microprocessor can execute the same.

In the example of FIG. 13, the FPGA circuitry 1300 is configured and/or structured in response to being programmed (and/or reprogrammed one or more times) based on a binary file. In some examples, the binary file may be compiled and/or generated based on instructions in a hardware description language (HDL) such as Lucid, Very High-Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1300 of FIG. 13 may access and/or load the binary file to cause the FPGA circuitry 1300 of FIG. 13 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1300 of FIG. 13 to cause configuration and/or structuring of the FPGA circuitry 1300 of FIG. 13, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1300 of FIG. 13 may access and/or load the binary file to cause the FPGA circuitry 1300 of FIG. 13 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1300 of FIG. 13 to cause configuration and/or structuring of the FPGA circuitry 1300 of FIG. 13, or portion(s) thereof.

The FPGA circuitry 1300 of FIG. 13, includes example input/output (I/O) circuitry 1302 to obtain and/or output data to/from example configuration circuitry 1304 and/or external hardware 1306. For example, the configuration circuitry 1304 may be implemented by interface circuitry that may obtain a binary file, which may be implemented by a bit stream, data, and/or machine-readable instructions, to configure the FPGA circuitry 1300, or portion(s) thereof. In some such examples, the configuration circuitry 1304 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof. In some examples, the external hardware 1306 may be implemented by external hardware circuitry. For example, the external hardware 1306 may be implemented by the microprocessor 1200 of FIG. 12.

The FPGA circuitry 1300 also includes an array of example logic gate circuitry 1308, a plurality of example configurable interconnections 1310, and example storage circuitry 1312. The logic gate circuitry 1308 and the configurable interconnections 1310 are configurable to instantiate one or more operations/functions that may correspond to at least some of the machine-readable instructions of FIGS. 7-10 and/or other desired operations. The logic gate circuitry 1308 shown in FIG. 13 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations/functions. The logic gate circuitry 1308 may include other electrical structures such as look-up tables (LUTs), registers (e.g., flip-flops or latches), multiplexers, etc.

The configurable interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example dedicated operations circuitry 1314. In this example, the dedicated operations circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the programmable circuitry 1112 of FIG. 11, many other approaches are contemplated. For example, FPGA circuitry may include an on-board CPU, such as one or more of the example CPU 1320 of FIG. 12. Therefore, the programmable circuitry 1112 of FIG. 11 may additionally be implemented by combining at least the example microprocessor 1200 of FIG. 12 and the example FPGA circuitry 1300 of FIG. 13. In some such hybrid examples, one or more cores 1202 of FIG. 12 may execute a first portion of the machine-readable instructions represented by the flowchart (s) of FIGS. 7-10 to perform first operation(s)/function(s), the FPGA circuitry 1300 of FIG. 13 may be configured and/or structured to perform second operation(s)/function(s) corresponding to a second portion of the machine-readable instructions represented by the flowcharts of FIG. 7-10, and/or an ASIC may be configured and/or structured to perform third operation(s)/function(s) corresponding to a third portion of the machine-readable instructions represented by the flowcharts of FIGS. 7-10.

It should be understood that some or all of the circuitry of FIG. 2 may, thus, be instantiated at the same or different times. For example, same and/or different portion(s) of the microprocessor 1200 of FIG. 12 may be programmed to execute portion(s) of machine-readable instructions at the same and/or different times. In some examples, same and/or different portion(s) of the FPGA circuitry 1300 of FIG. 13 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 1200 of FIG. 12 may execute machine-readable instructions in one or more threads executing concurrently and/or in series. In some examples, the FPGA circuitry 1300 of FIG. 13 may be configured and/or structured to carry out operations/functions concurrently and/or in series. Moreover, in some examples, some or all of the circuitry of FIG. 2 may be implemented within one or more virtual machines and/or containers executing on the microprocessor 1200 of FIG. 12.

In some examples, the programmable circuitry 1112 of FIG. 11 may be in one or more packages. For example, the microprocessor 1200 of FIG. 12 and/or the FPGA circuitry 1300 of FIG. 13 may be in one or more packages. In some examples, an XPU may be implemented by the programmable circuitry 1112 of FIG. 11, which may be in one or more packages. For example, the XPU may include a CPU (e.g., the microprocessor 1200 of FIG. 12, the CPU 1320 of FIG. 13, etc.) in one package, a DSP (e.g., the DSP 1322 of FIG. 13) in another package, a GPU in yet another package, and an FPGA (e.g., the FPGA circuitry 1300 of FIG. 13) in still yet another package.

Figure 14:
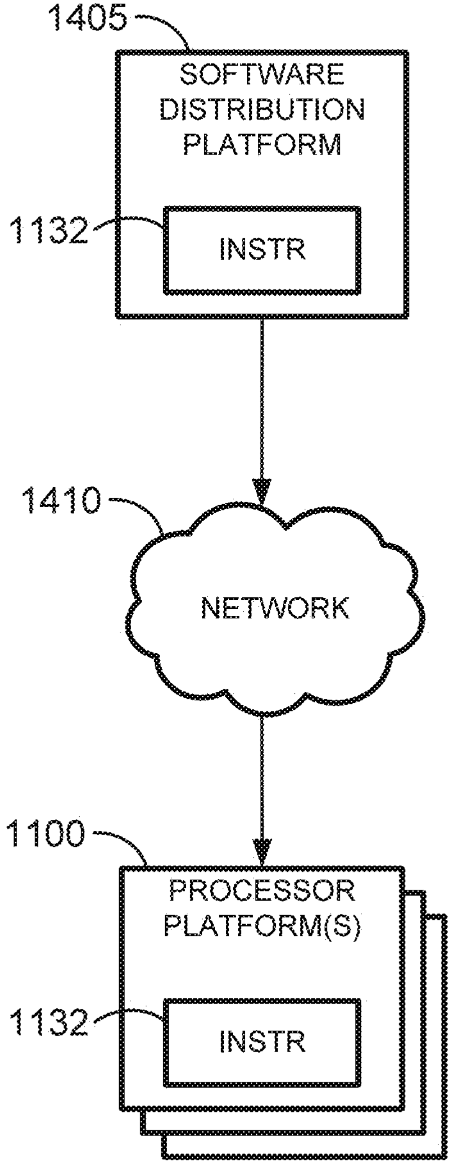
FIG. 14 is a block diagram of an example software/firmware/instructions distribution platform (e.g., one or more servers) to distribute software, instructions, and/or firmware (e.g., corresponding to the example machine-readable instructions of FIGS. 7-10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine-readable instructions 1132 of FIG. 11 to other hardware devices (e.g., hardware devices owned and/or operated by third parties from the owner and/or operator of the software distribution platform) is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine-readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine-readable instructions 1132, which may correspond to the example machine-readable instructions of FIGS. 7-10, as described above. The one or more servers of the example software distribution platform 1405 are in communication with an example network 1410, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1132 from the software distribution platform 1405. For example, the software, which may correspond to the example machine-readable instructions of FIG. 7-10, may be downloaded to the example programmable circuitry platform 1100, which is to execute the machine-readable instructions 1132 to implement the soft boundary generation circuitry. In some examples, one or more servers of the software distribution platform 1405 periodically offer, transmit, and/or force updates to the software (e.g., the example machine-readable instructions 1132 of FIG. 11) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that perform soft boundary generation to determine the travel of a vehicle. Disclosed systems, apparatus, articles of manufacture, and methods improve the efficiency of using a computing device by improving boundary generation and determination of autonomy for vehicle operation. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to perform subzone boundary generation to determine the travel of a vehicle are disclosed herein. Further examples and combinations thereof include the following:

Example 1 includes a non-transitory computer-readable medium comprising instructions which, when executed, cause processor circuitry to generate a first boundary based on a query for a boundary of a plot of land, compute a first probabilistic boundary for the first boundary based on an error of generation of the first boundary, compute a second probabilistic boundary for a second boundary based on an error of generation of the second boundary, and combine the first probabilistic boundary and the second probabilistic boundary to generate a soft boundary, the combination based on a first confidence score and a second confidence score.

Example 2 includes the non-transitory computer-readable medium of example 1, wherein the instructions are to cause the processor circuitry to generate the first boundary and/or the second boundary based on satellite images, convex and concave hulls of machine operations, and boundaries from geometric operations on machine operations.

Example 3 includes the non-transitory computer-readable medium of example 1 and example 2, wherein the instructions are to cause the processor circuitry to assign the first confidence score to the first boundary based on a first attribute of the first boundary, and assign the second confidence score to the second boundary based on a second attribute of the second boundary.

Example 4 includes the non-transitory computer-readable medium of examples 1-3, wherein at least one of the first attribute or the second attribute correspond to a technique of generation of the first boundary or the second boundary, respectively.

Example 5 includes the non-transitory computer-readable medium of examples 1-4, wherein the instructions are to cause the processor circuitry to calculate a contour based on a confidence threshold.

Example 6 includes the non-transitory computer-readable medium of example 5, wherein the instructions are to cause the processor circuitry to recommend whether the plot of land is ready for autonomous vehicle operation based on the confidence threshold.

Example 7 includes the non-transitory computer-readable medium of examples 1-6, wherein the instructions are to cause the processor circuitry to determine whether a third boundary in memory for the plot of land is up to date, and if in memory and up to date, generate the soft boundary using the first boundary, the second boundary, and the third boundary.

Example 8 includes a method to determine a boundary for vehicle operation in a queried plot of land, comprising generating a first boundary based on a query for a boundary of a plot of land, computing a first probabilistic boundary for the first boundary based on an error of generation of the first boundary, computing a second probabilistic boundary for a second boundary based on an error of generation of the second boundary, and combining the first probabilistic boundary and the second probabilistic boundary to generate a soft boundary, the combination based on a first confidence score for the first boundary and a second confidence score for the second boundary.

Example 9 includes the method of example 8, further including generating the first boundary and/or the second boundary based on satellite images, convex and concave hulls of machine operations, and boundaries from geometric operations on machine operations.

Example 10 includes the method of example 8 and example 9, further including assigning the first confidence score to the first boundary based on a first attribute of the first boundary, and assigning the second confidence score to the second boundary based on a second attribute of the second boundary.

Example 11 includes the method of examples 8-10, wherein at least one of the first attribute or the second attribute correspond to a technique of generation of the first boundary or the second boundary, respectively.

Example 12 includes the method of examples 8-11, further including calculating a contour based on a confidence threshold.

Example 13 includes the method of example 12, further including recommending whether the plot of land is ready for autonomous vehicle operation based on the confidence threshold.

Example 14 includes the method of examples 8-13, further including determining whether a third boundary in memory for the plot of land is up to date, and if in memory and up to date, generating the soft boundary using the first boundary, the second boundary, and the third boundary.

Example 15 includes an apparatus to determine a boundary for vehicle operation in a queried plot of land, comprising interface circuitry, memory, and at least one processor circuit to be programmed by machine-readable instructions to generate a first boundary based on a query for a boundary of a plot of land, compute a first probabilistic boundary for the first boundary based on an error of generation of the first boundary, compute a second probabilistic boundary for a second boundary based on an error of generation of the second boundary, and combine the first probabilistic boundary and the second probabilistic boundary to generate a soft boundary, the combination based on a first confidence score and a second confidence score.

Example 16 includes the apparatus of example 15, wherein one or more of the at least one processor circuit is to generate the first boundary and/or the second boundary based on satellite images, convex and concave hulls of machine operations, and boundaries from geometric operations on machine operations.

Example 17 includes the apparatus of example 15 and example 16, wherein one or more of the at least one processor circuit is to assign the first confidence score to the first boundary based on a first attribute of the first boundary, and assign the second confidence score to the second boundary based on a second attribute of the second boundary.

Example 18 includes the apparatus of examples 15-17, wherein at least one of the first attribute or the second attribute correspond to a technique of generation of the first boundary or the second boundary, respectively.

Example 19 includes the apparatus of examples 15-18, wherein one or more of the at least one processor circuit is to calculate a contour based on a confidence threshold.

Example 20 includes the apparatus of example 19, wherein one or more of the at least one processor circuit is to recommend whether the plot of land is ready for autonomous vehicle operation based on the confidence threshold.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A non-transitory computer-readable medium comprising instructions which, when executed, cause processor circuitry to:
- generate a first boundary based on a query for a boundary of a plot of land;
- compute a first probabilistic boundary for the first boundary based on an error of generation of the first boundary;
- compute a second probabilistic boundary for a second boundary based on an error of generation of the second boundary;
- combine the first probabilistic boundary and the second probabilistic boundary to generate a soft boundary, the combination based on a first confidence score for the first boundary and a second confidence score for the second boundary; and
- cause operation of an agricultural vehicle based on the soft boundary.

2. The non-transitory computer-readable medium of claim 1, wherein the instructions are to cause the processor circuitry to generate the first boundary and/or the second boundary based on at least one of satellite images, convex and concave hulls of machine operations, or boundaries from geometric operations on machine operations.

3. The non-transitory computer-readable medium of claim 1, wherein the instructions are to cause the processor circuitry to:
- assign the first confidence score to the first boundary based on a first attribute of the first boundary; and
- assign the second confidence score to the second boundary based on a second attribute of the second boundary.

4. The non-transitory computer-readable medium of claim 3, wherein at least one of the first attribute or the second attribute correspond to a technique of the generation of the first boundary or the second boundary, respectively.

5. The non-transitory computer-readable medium of claim 1, wherein the instructions are to cause the processor circuitry to calculate a contour based on a confidence threshold.

6. The non-transitory computer-readable medium of claim 5, wherein the instructions are to cause the processor circuitry to recommend whether the plot of land is ready for autonomous vehicle operation based on the confidence threshold.

7. The non-transitory computer-readable medium of claim 1, wherein the instructions are to cause the processor circuitry to:
- determine whether a third boundary in memory for the plot of land is up to date; and
- if in the memory and up to date, generate the soft boundary using the first boundary, the second boundary, and the third boundary.

8. A method to determine a boundary for vehicle operation in a queried plot of land, comprising:
- generating a first boundary based on a query for a boundary of a plot of land;
- computing a first probabilistic boundary for the first boundary based on an error of generation of the first boundary;
- computing a second probabilistic boundary for a second boundary based on an error of generation of the second boundary;
- combining the first probabilistic boundary and the second probabilistic boundary to generate a soft boundary, the combination based on a first confidence score for the first boundary and a second confidence score for the second boundary; and
- causing operation of an agricultural vehicle based on the soft boundary.

9. The method of claim 8, further including generating the first boundary and/or the second boundary based on at least one of satellite images, convex and concave hulls of machine operations, or boundaries from geometric operations on machine operations.

10. The method of claim 8, further including:
- assigning the first confidence score to the first boundary based on a first attribute of the first boundary; and
- assigning the second confidence score to the second boundary based on a second attribute of the second boundary.

11. The method of claim 10, wherein at least one of the first attribute or the second attribute correspond to a technique of the generation of the first boundary or the second boundary, respectively.

12. The method of claim 8, further including calculating a contour based on a confidence threshold.

13. The method of claim 12, further including recommending whether the plot of land is ready for autonomous vehicle operation based on the confidence threshold.

14. The method of claim 8, further including:
- determining whether a third boundary in memory for the plot of land is up to date; and
- if in the memory and up to date, generating the soft boundary using the first boundary, the second boundary, and the third boundary.

15. An apparatus to determine a boundary for vehicle operation in a queried plot of land, comprising:
- interface circuitry;
- memory; and
- at least one processor circuit to be programmed by machine-readable instructions to:
  - generate a first boundary based on a query for a boundary of a plot of land;
  - compute a first probabilistic boundary for the first boundary based on an error of generation of the first boundary;
  - compute a second probabilistic boundary for a second boundary based on an error of generation of the second boundary;
  - combine the first probabilistic boundary and the second probabilistic boundary to generate a soft boundary, the combination based on a first confidence score for the first boundary and a second confidence score for the second boundary; and
  - cause operation of an agricultural vehicle based on the soft boundary.

16. The apparatus of claim 15, wherein one or more of the at least one processor circuit is to generate the first boundary and/or the second boundary based on at least one of satellite images, convex and concave hulls of machine operations, or boundaries from geometric operations on machine operations.

17. The apparatus of claim 15, wherein one or more of the at least one processor circuit is to:

assign the first confidence score to the first boundary based on a first attribute of the first boundary; and assign the second confidence score to the second boundary based on a second attribute of the second boundary.

18. The apparatus of claim 17, wherein at least one of the first attribute or the second attribute correspond to a technique of the generation of the first boundary or the second boundary, respectively.

19. The apparatus of claim 15, wherein one or more of the at least one processor circuit is to calculate a contour based on a confidence threshold.

20. The apparatus of claim 19, wherein one or more of the at least one processor circuit is to recommend whether the plot of land is ready for autonomous vehicle operation based on the confidence threshold.

* * * * *